US010552103B2

(12) United States Patent
Sakata

(10) Patent No.: US 10,552,103 B2
(45) Date of Patent: Feb. 4, 2020

(54) PRINT CONTROL METHOD FOR PERFORMING PRINT PROCESS ACCORDING TO PRINT DATA, STORAGE MEDIUM STORING PRINT CONTROL PROGRAM, AND INFORMATION PROCESSING APPARATUS CONTROLLING IMAGE FORMING APPARATUS TO PERFORM PRINT PROCESS

(71) Applicant: CANON KABUSHIKI KAISHA, Tokyo (JP)

(72) Inventor: Munetaka Sakata, Matsudo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/976,469

(22) Filed: May 10, 2018

(65) Prior Publication Data

US 2018/0260173 A1    Sep. 13, 2018

Related U.S. Application Data

(63) Continuation of application No. 15/239,091, filed on Aug. 17, 2016, now Pat. No. 9,996,305.

(30) Foreign Application Priority Data

Aug. 26, 2015   (JP) .................. 2015-166813

(51) Int. Cl.
  *H04N 1/04*   (2006.01)
  *G06F 3/12*   (2006.01)
  *H04N 1/00*   (2006.01)

(52) U.S. Cl.
  CPC ............ *G06F 3/1234* (2013.01); *G06F 3/121* (2013.01); *G06F 3/1204* (2013.01);
  (Continued)

(58) Field of Classification Search
  CPC ... H04N 1/00408; G06F 3/1234; G06F 3/121; G06F 3/1204; G06F 3/1211
  (Continued)

(56) References Cited

U.S. PATENT DOCUMENTS

| | | | |
|---|---|---|---|
| 6,567,175 B1 | 5/2003 | Lee | |
| 9,996,305 B2 * | 6/2018 | Sakata | G06F 3/1234 |
| 2002/0067496 A1 * | 6/2002 | Nishikata | G06K 15/00 |
| | | | 358/1.13 |

FOREIGN PATENT DOCUMENTS

| | | | | |
|---|---|---|---|---|
| JP | H09237026 A | | 9/1997 | |
| JP | 2000-322208 | * | 11/2000 | ............ G06F 13/00 |

(Continued)

OTHER PUBLICATIONS

Office Action issued in U.S. Appl. No. 15/239,091 dated Jul. 12, 2017.

(Continued)

*Primary Examiner* — Nicholas Pachol
(74) *Attorney, Agent, or Firm* — Rossi, Kimms & McDowell LLP

(57) ABSTRACT

A print control method that is capable of canceling the unprintable state without troubling a user. An image forming apparatus performs a print process according to print data transmitted from an information processing apparatus by the print control method. An anomaly detection step detects anomaly in a print related process, which is relevant to the print process, under execution by the information processing apparatus. A state shifting step stops the print process under execution by the image forming apparatus, and makes the image forming apparatus shift to a printable state for preparing a new print process that is different from the print process that the image forming apparatus is executing when anomaly is detected in the print related process. A reboot (Continued)

step reboots the information processing apparatus in response to the shift of the image forming apparatus to the printable state.

10 Claims, 19 Drawing Sheets

(52) U.S. Cl.
CPC .......... *G06F 3/1211* (2013.01); *G06F 3/1274* (2013.01); *H04N 1/00408* (2013.01); *H04N 2201/0094* (2013.01)

(58) Field of Classification Search
USPC ...................................... 358/1.14, 1.13, 1.15
See application file for complete search history.

(56) References Cited

FOREIGN PATENT DOCUMENTS

| | | |
|---|---|---|
| JP | 2000322208 A | 11/2000 |
| JP | 2008171303 A | 7/2008 |

OTHER PUBLICATIONS

Office Action issued in U.S. Appl. No. 15/239,091 dated Nov. 27, 2017.
Notice of Allowance issued in U.S. Appl. No. 15/239,091 dated Feb. 13, 2018.
Office Action issued in Japanese Application No. 2015-166813 dated Jan. 15, 2019.

\* cited by examiner

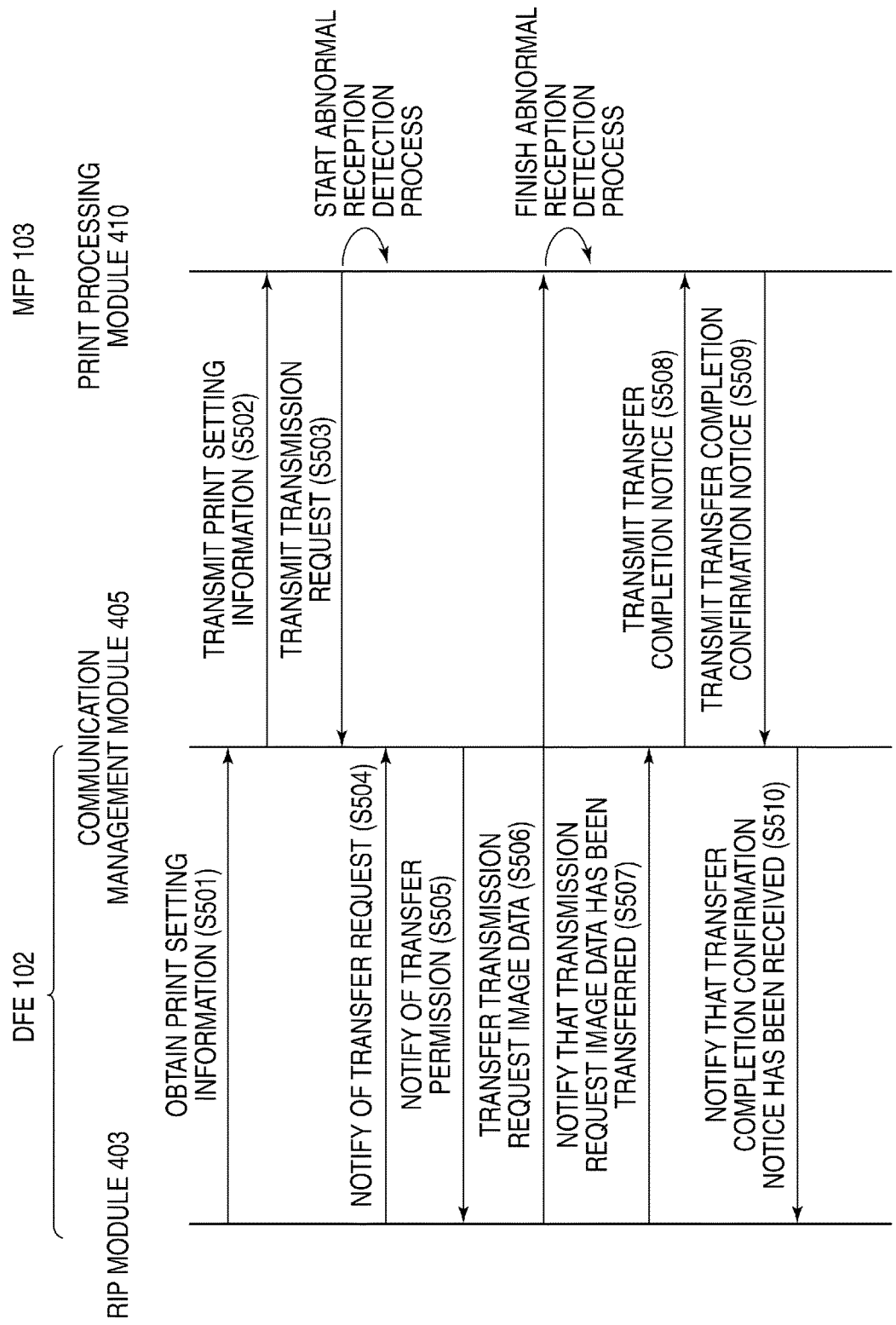

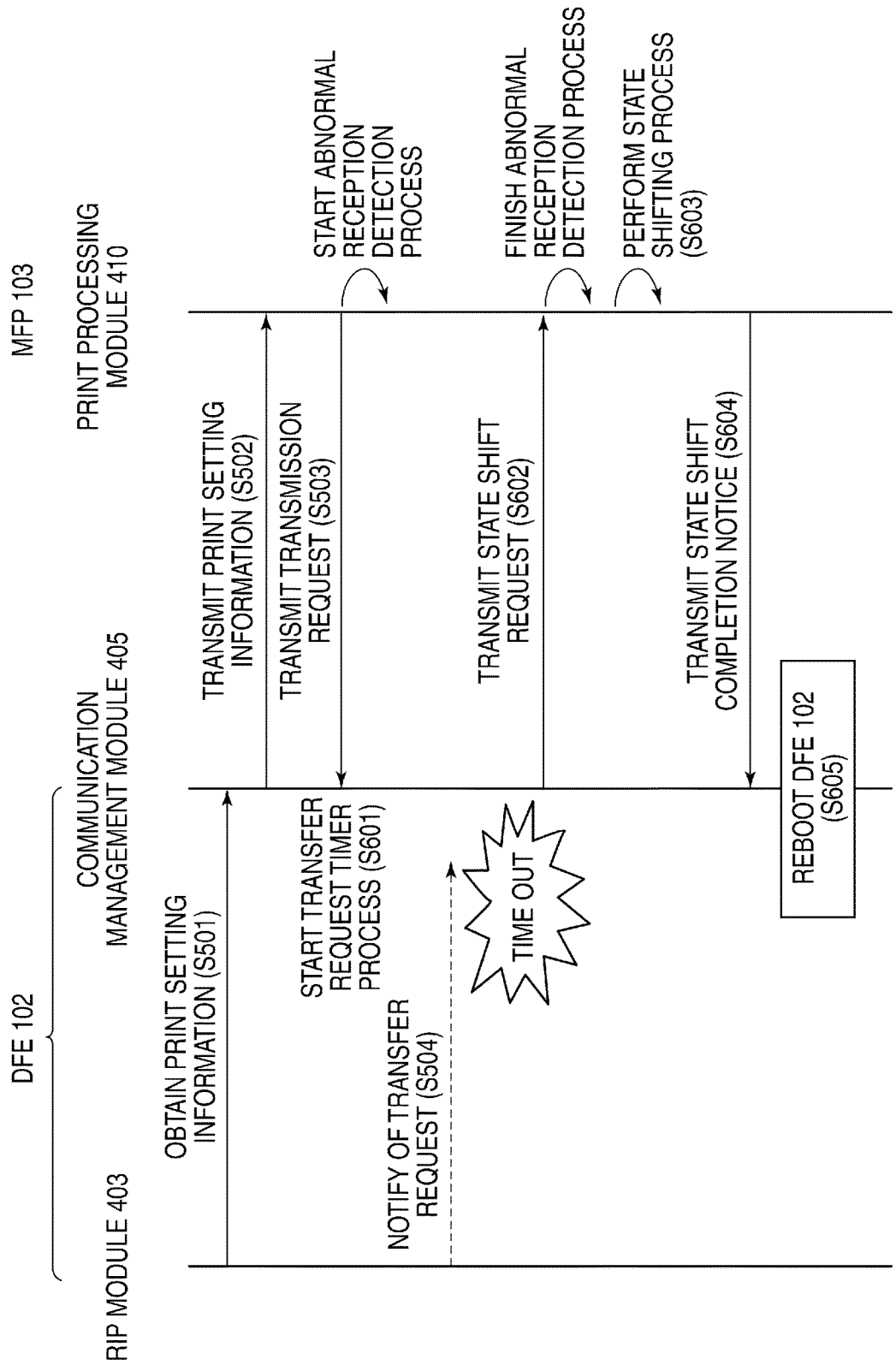

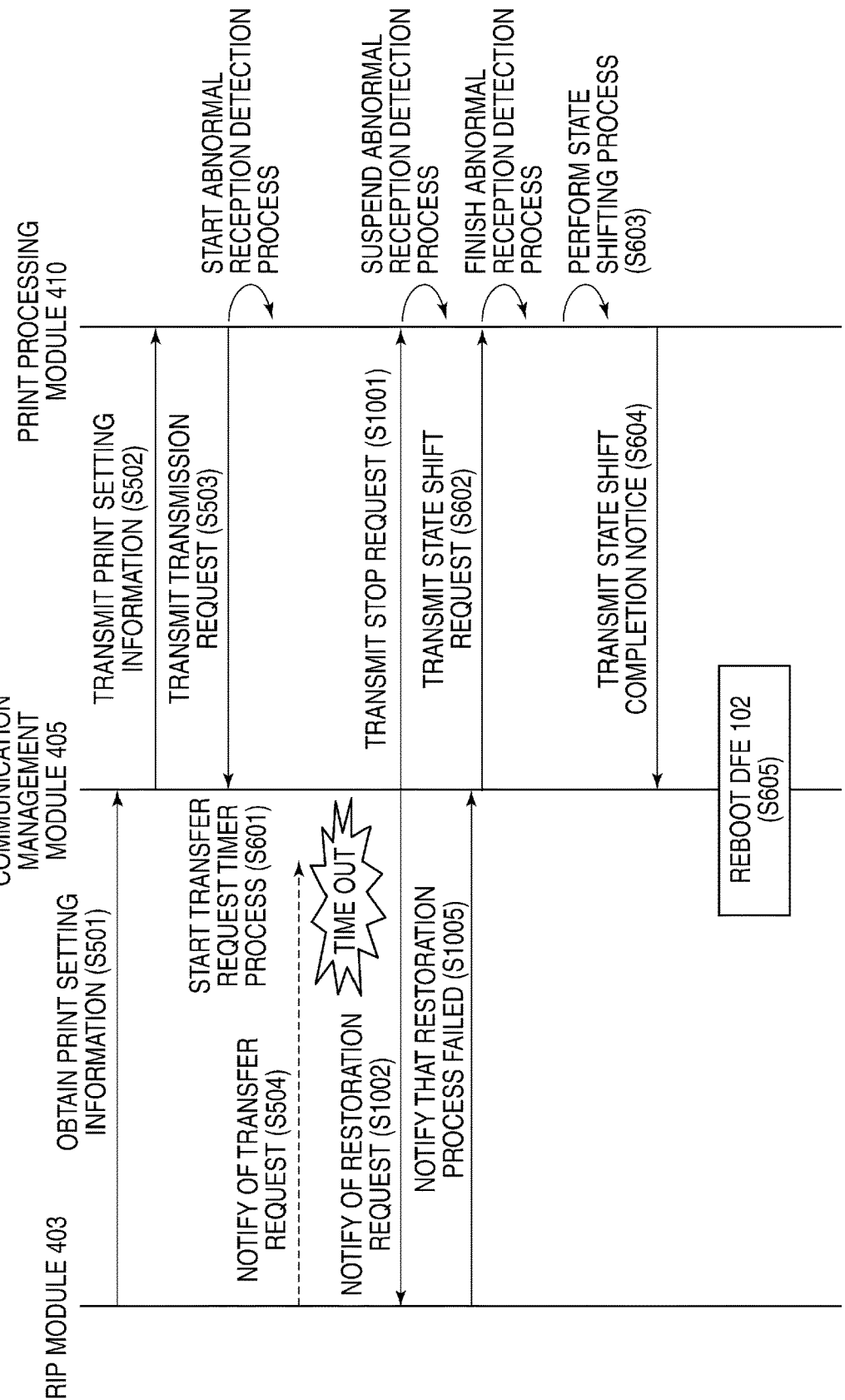

PRINT CONTROL METHOD FOR PERFORMING PRINT PROCESS ACCORDING TO PRINT DATA, STORAGE MEDIUM STORING PRINT CONTROL PROGRAM, AND INFORMATION PROCESSING APPARATUS CONTROLLING IMAGE FORMING APPARATUS TO PERFORM PRINT PROCESS

BACKGROUND OF THE INVENTION

Field of the Invention

The present invention relates to a print control method that performs a print process according to print data, a storage medium storing a print control program, and an information processing apparatus controlling an image forming apparatus to perform a print process.

Description of the Related Art

There is a known print system that performs a print process according to print data transmitted from a client PC etc. In the print system, a DFE (Digital Front End) as an information processing apparatus receives the print data from a client PC etc., converts the received print data into raster image data that is readable by an MFP (Multi-Functional Peripheral) as an image forming apparatus, and transmits the raster image data concerned to the MFP. The MFP prints on the basis of the received raster image data (hereinafter referred to as "received data printing", see Japanese Laid-Open Patent Publication (Kokai) No. H9-237026 (JP H9-237026A), for example). Moreover, the MFP is able to print according to an operation through an operation unit of the MFP (hereinafter referred to as "local printing") in addition to the received data printing.

Incidentally, in the print system, a transmission error occurs when a transmitting process of raster image data from the DFE to the MFP is not completed until predetermined time elapses from start of the transmitting process. When the transmission error occurs in the print system, the MFP goes into a state where neither the received data printing nor the local printing can be performed (hereinafter referred to as an "unprintable state"). In this case, a user needs to reboot not only the MFP that goes into the unprintable state but also the DFE that transmits the raster image data.

However, it is necessary to perform the reboot processes of the MFP and the DFE individually. Accordingly, a user will spend time and effort more than needed about dissolution of the unprintable state.

SUMMARY OF THE INVENTION

The present invention provides a print control method, a storage medium storing a print control program, and an information processing apparatus, which are capable of canceling the unprintable state without troubling a user.

Accordingly, a first aspect of the present invention provides a print control method by which an image forming apparatus performs a print process according to print data transmitted from an information processing apparatus, the print control method including an anomaly detection step of detecting anomaly in a print related process, which is relevant to the print process, under execution by the information processing apparatus, a state shifting step of stopping the print process under execution by the image forming apparatus, and of making the image forming apparatus shift to a printable state for preparing a new print process that is different from the print process that the image forming apparatus is executing when anomaly is detected in the print related process, and a reboot step of rebooting the information processing apparatus in response to the shift of the image forming apparatus to the printable state.

Accordingly, a second aspect of the present invention provides a non-transitory computer-readable storage medium storing a control program causing a computer to execute the print control method of the first aspect.

Accordingly, a third aspect of the present invention provides an information processing apparatus including a transmission unit configured to transmit print data used in a print process to an image forming apparatus by executing a print related process that is relevant to the print process, and to make the image forming apparatus execute the print process according to the print data, an anomaly detection unit configured to detect anomaly in the print related process, a state shift control unit configured to stop the print process under execution by the image forming apparatus, and to make the image forming apparatus shift to a printable state for preparing a new print process that is different from the print process that the image forming apparatus is executing when anomaly is detected in the print related process, and a reboot unit configured to reboot in response to the shift of the image forming apparatus to the printable state.

According to the present invention, an unprintable state can be canceled, without troubling a user.

Further features of the present invention will become apparent from the following description of exemplary embodiments with reference to the attached drawings.

BRIEF DESCRIPTION OF THE DRAWINGS

FIG. 5 is a sequential chart showing procedures of a transfer process executed by the print system in FIG. 1.

FIG. 6 is a sequential chart showing procedures of a transfer control process executed by the print system in FIG. 1.

FIG. 10A and FIG. 10B are sequential charts showing procedures of a first modification of the transfer control process in FIG. 6. FIG. 10A shows a case where a restoration process succeeded, and FIG. 10B shows a case where the restoration process failed.

DESCRIPTION OF THE EMBODIMENTS

Hereafter, embodiments according to the present invention will be described in detail with reference to the drawings.

Although the embodiment describes the case where the present invention is applied to an MFP as an image forming apparatus, the present invention is able to be applied to an apparatus other than the MFP. The present invention may be applied to an image forming apparatus including an SFP (Single Function Printer) and an LBP (Laser Beam Printer), for example.

Figure 1:
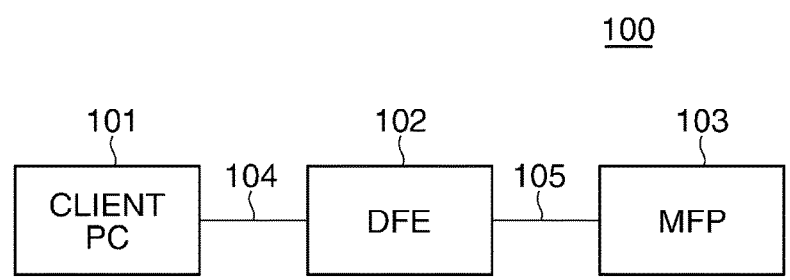
FIG. 1 is a block diagram schematically showing a print system including a DFE as an information processing apparatus according to an embodiment of the present invention.

FIG. 1 is a block diagram schematically showing a print system 100 including a DFE (Digital Front End) 102 as an information processing apparatus according to the embodiment of the present invention.

As shown in FIG. 1, the print system 100 has a client PC 101, the DFE 102, and an MFP (Multi-Functional Peripheral) 103. The client PC 101 and the DFE 102 are connected through a network 104. The DFE 102 and the MFP 103 are connected through a network 105.

The client PC 101 transmits print data, such as PDL data used by a print process, to the DFE 102. The DFE 102 performs a RIP (Raster Image Process) according to the received print data, generates image data, such as raster image data, that is readable by the MFP 103, and transmits the image data and information about various settings (hereinafter referred to as "print setting information") included in the image data and print data to the MFP 103. The MFP 103 prints the received data according to the image data and the print setting information that have been received. Moreover, the MFP 103 performs a local printing according to setting information set up by an operation through an operation panel (not shown) that is provided in the MFP 103.

Figure 2:
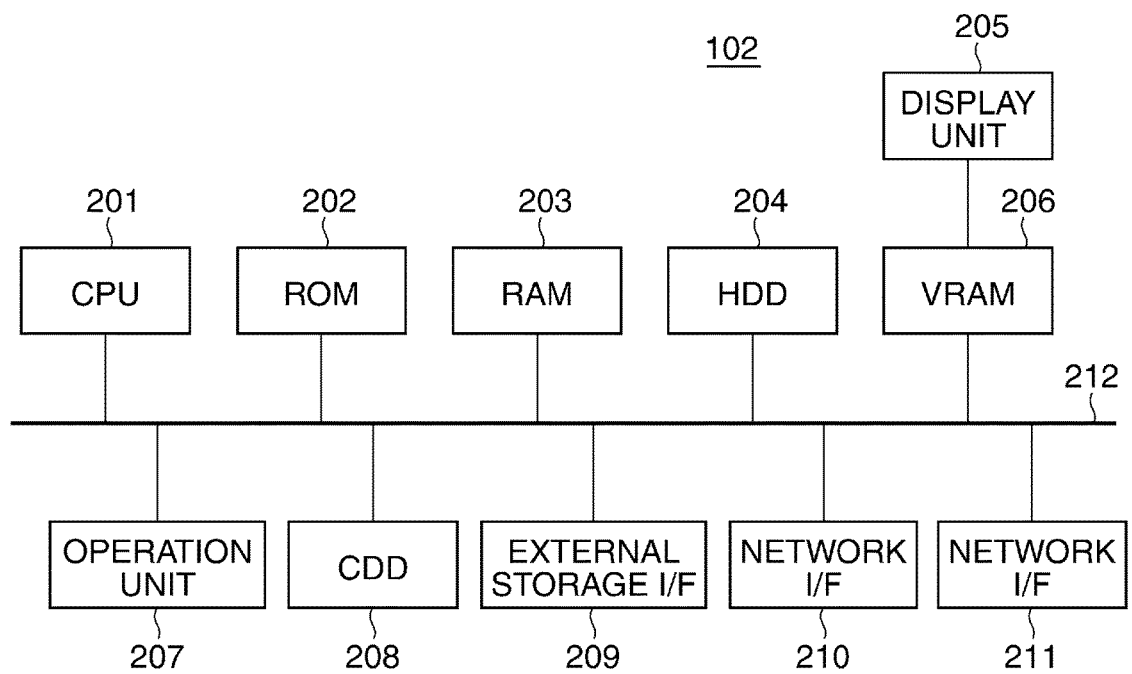
FIG. 2 is a block diagram schematically showing a configuration of the DFE in FIG. 1.

FIG. 2 is a block diagram schematically showing a configuration of the DFE 102 in FIG. 1.

As shown in FIG. 2, the DFE 102 is provided with a CPU 201, ROM 202, RAM 203, HDD 204, display unit 205, video random access memory (VRAM) 206, operation unit 207, and compact disc drive (CDD) 208. Furthermore, the DFE 102 is provided with an external recording I/F 209 and network I/Fs 210 and 211. The CPU 201, ROM 202, RAM 203, HDD 204, video RAM 206, operation unit 207, CDD 208, external recording I/F 209, and network I/Fs 210 and 211 are mutually connected through a system bus 212. The display unit 205 is connected to the VRAM 206.

The CPU 201 integrally controls the entire DFE 102. The ROM 202 stores various programs that will be executed by the CPU 201. The RAM 203 is as a working area of the CPU 201, and is used as a temporary storage area for various data. The HDD 204 stores various programs and various kinds of data. The display unit 205 displays a various types of images. The VRAM 206 stores display image data for displaying a various types of images on the display unit 205. The operation unit 207 includes a keyboard, a mouse, etc. (not shown), and allows a user's operation to set the information about various settings in the DFE 102 through the operation unit 207. The CDD 208 performs a process for reading and writing data with various recording media, such as a CD-ROM and CD-R. The external recording I/F 209 performs data communication with an external storage medium, such as an USB memory. The network I/Fs 210 and 211 perform data communication with various apparatuses that are connected with the network 104 or 105. In the embodiment, the network I/F 210 receives the print data from the client PC 101 connected to the network 104. Moreover, the network I/F 211 transmits the variety of information about the print process, such as image data and print setting information, to the MFP 103 connected to the network 105.

Figure 3:
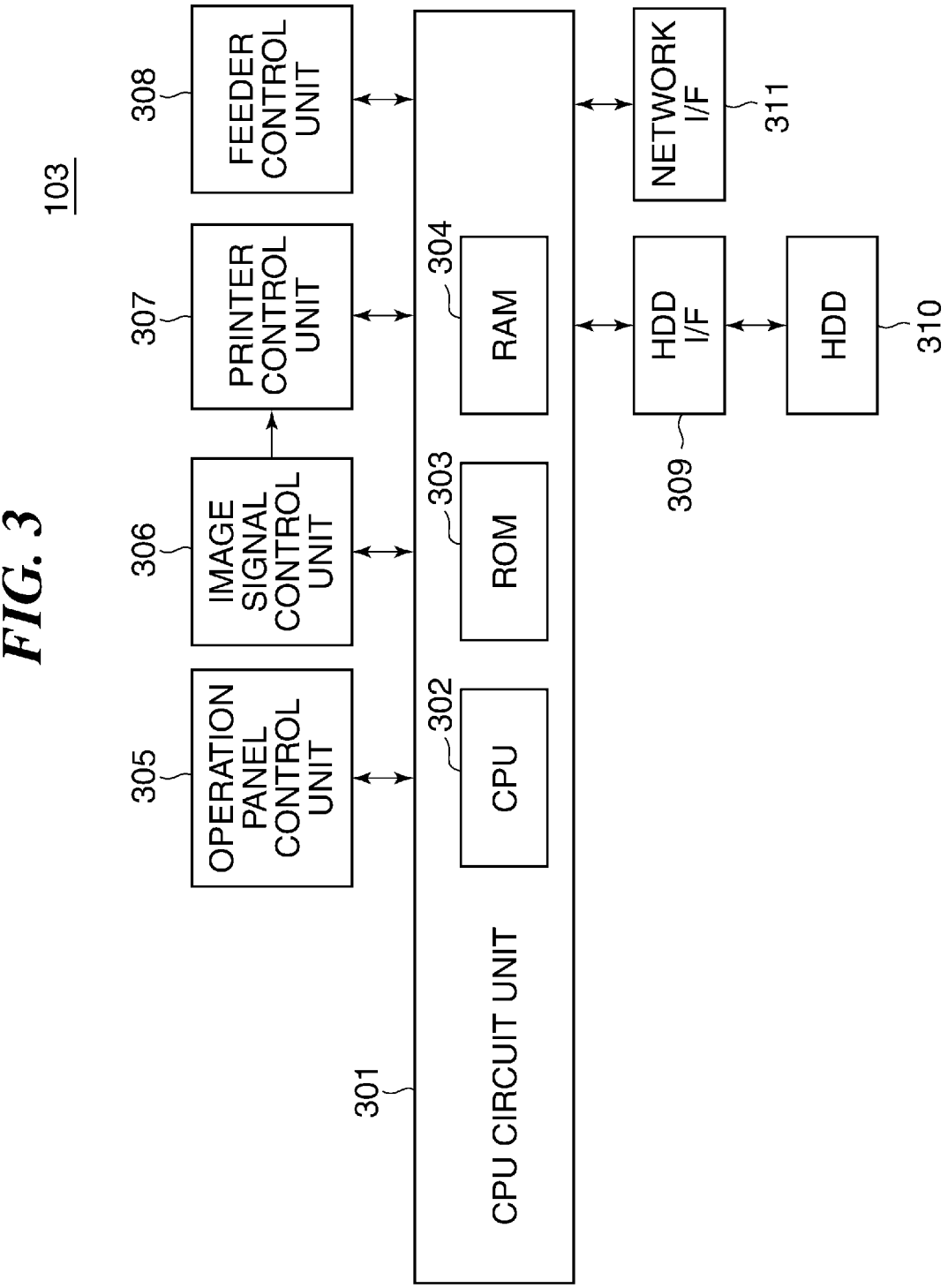
FIG. 3 is a block diagram schematically showing a configuration of an MFP in FIG. 1.

FIG. 3 is a block diagram schematically showing the configuration of the MFP 103 in FIG. 1.

As shown in FIG. 3, the MFP 103 is provided with a CPU circuit unit 301, operation panel control unit 305, image signal control unit 306, printer control unit 307, sheet-feeding control unit 308, HDD I/F 309, HDD 310, and network I/F 311. The CPU circuit unit 301 is connected to the components including the operation panel control unit 305, image signal control unit 306, printer control unit 307, sheet-feeding control unit 308, HDD I/F 309, and network I/F 311, respectively. The image signal control unit 306 is connected to the printer control unit 307, and the HDD I/F 309 is connected to the HDD 310. The CPU circuit unit 301 includes a CPU 302, ROM 303, and RAM 304.

The CPU circuit unit 201 integrally controls the MFP 103. The CPU 302 controls the components that are connected to the CPU circuit unit 301 by running the various programs stored in the ROM 303. The ROM 303 stores the various programs that will be executed by the CPU 302. The RAM 304 is used as a working area of the CPU 302 and a temporary storage area for various data used by the CPU 302. In the embodiment, a part of the storage area of the RAM 304 is allocated to a primary buffer for storing the image data transmitted from the DFE 102 during the print process, for example. The operation panel control unit 305 displays a setting menu for performing various settings of the MFP 103, various notices, etc. on a display unit (not shown) of the MFP 103. The image signal control unit 306 converts the image data etc. received from the DFE 102 into an image signal that is readable by the printer control unit 307, and transmits the image signal concerned to the printer control unit 307. The printer control unit 307 prints an image on a paper sheet as a recording sheet according to the received image signal. The sheet-feeding control unit 308 conveys the paper sheet concerned from a sheet feeding unit (not shown) to the printer control unit 307. The HDD I/F unit 309 performs data communication with the HDD 310. The HDD 310 is a large capacity storage device, and stores nonvolatile data. The network I/F 311 performs data communication with the DFE 102 that is connected to the network 105.

Figure 4A:
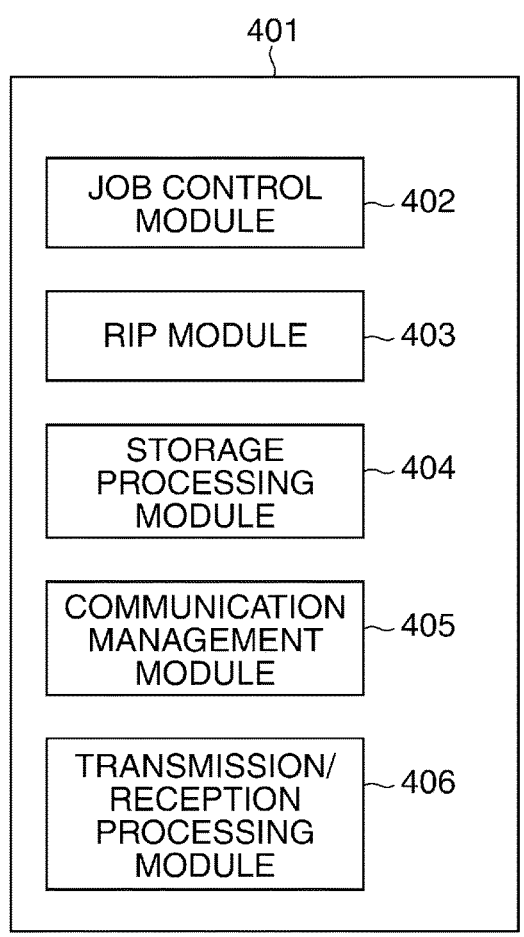
FIG. 4A is a block diagram schematically showing a configuration of software module of the DFE in FIG. 1.
Figure 4B:
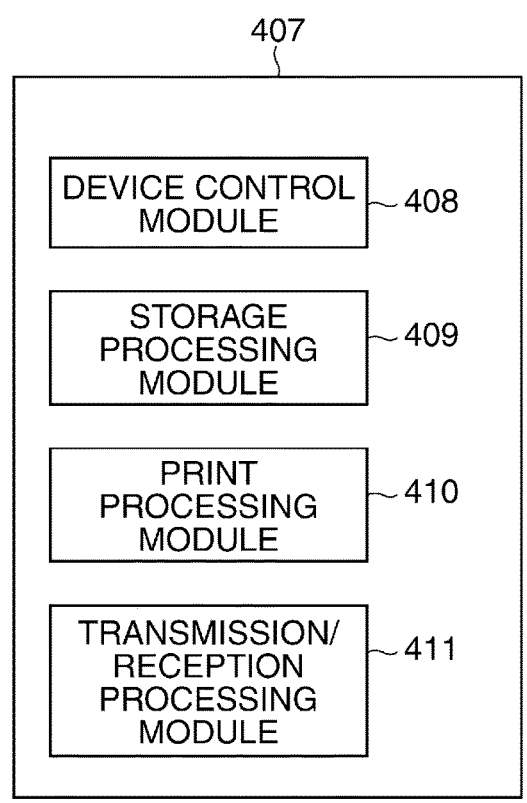
FIG. 4B is a block diagram schematically showing a configuration of software module of the MFP in FIG. 1.

FIG. 4A is a block diagram showing a configuration of software module 401 of the DFE 102 in FIG. 1. FIG. 4B is a block diagram showing a configuration of software module 407 of the MFP 103 in FIG. 1.

As shown in FIG. 4A, the software module 401 is provided with a job control module 402, RIP module 403, storage processing module 404, communication management module 405, and transmission/reception processing module 406. Various processes of the software module 401 are performed when the CPU 201 of the DFE 102 runs the various programs stored in the ROM 202.

The job control module 402 stores the print data transmitted from the client PC 103 into the RAM 203. The RIP module 403 extracts the print setting information from the print data stored in the RAM 203. Moreover, the RIP module 403 applies the raster image process to the print data stored in the RAM 203 to generate image data, and performs a transfer process for transferring the generated image data to the MFP 103. Furthermore, the RIP unit 403 is able to restore anomaly in the transfer process, when the anomaly is detected in the transfer process. The storage processing module 404 stores the generated image data and the print setting information into the HDD 204. The communication management module 405 manages the various notices about the various processes concerning the print process of the MFP 103 to manage the sequence of the print process of the MFP 103, for example. The transmission/reception processing module 406 manages data communication with the client PC 101 and the MFP 103.

As shown in FIG. 4B, the software module 407 is provided with a device control module 408, storage processing module 409, print processing module 410, and transmission/reception processing module 411. Various processes of the software module 407 are performed when the CPU 302 of the MFP 103 runs the various programs stored in the ROM 303.

The device control module 408 receives the print setting information from the DFE 102, and stores the print setting information into the RAM 304. Moreover, the device control module 408 analyzes the stored print setting information, and instructs the storage processing module 409 to prepare to store image data (hereinafter referred to as a "storing preparation instruction"). The storage processing module 409 allocates a part of the storage area of the RAM 304 to a primary buffer according to the storing preparation instruction from the device control module 408. Moreover, the storage processing module 409 stores the image data received from the DFE 102 into the primary buffer of the RAM 304, and instructs the print processing module 410 to print. The print processing module 410 reads the print setting information stored in the RAM 304 and the image data stored in the primary buffer. Moreover, the print processing module 410 performs various types of print control. For example, the print processing module 410 controls the image signal control unit 306, printer control unit 307, and sheet-feeding control unit 308 so as to print according to the image data and print setting information. The transmission/reception processing module 411 controls the data communication with the DFE 102.

FIG. 5 is a sequential chart showing procedures of a transfer process executed by the print system 100 in FIG. 1.

The process in FIG. 5 is performed when the CPU 201 of the DFE 102 runs the various programs stored in the ROM 202 and the CPU 302 of the MFP 103 runs the various programs stored in the ROM 303.

As shown in FIG. 5, the CPU 201 first obtains the print setting information that is extracted by the RIP module 403 using the communication management module 405 (step S501). The print setting information includes various types of information about the print process, such as a sheet size, the number of pages of printed matter, and the number of print copies. Next, the CPU 201 transmits the print setting information concerned to the MFP 103 using the communication management module 405 (step S502).

When receiving the print setting information, the CPU 302 starts the print process, and transmits a transmission request that requires transmission of image data on the basis of the received print setting information to the DFE 102 using the print processing module 410 (step S503). For example, when performing the print process for printed matter having a plurality of pages, the CPU 302 transmits the transmission requests corresponding to the image data of the respective pages to the DFE 102 using the print processing module 410. The DFE 102 transmits the image data corresponding to the respective transmission requests received (hereinafter referred to as "transmission request image data") to the MFP 103. In the embodiment, it is assumed that the CPU 302 transmits the transmission request for the image data of the first page to the DFE 102, as an example. Moreover, the CPU 302 reserves the primary buffer that stores the image data concerned in the RAM 304. Furthermore, the CPU 302 starts an abnormal reception detection process that detects anomaly in the reception process of the image data transmitted from the DFE 102 in parallel to the process in the step S503. In the abnormal reception detection process, when the image data corresponding to the transmission request is not received until a predetermined receivable time period elapses after the transmission request concerned is transmitted, the CPU 302 determines that there is anomaly in the reception process of the image data corresponding to the transmission request, for example. The receivable time period means a period during which the abnormal reception detection process is performed, and is set to 60 seconds, for example. On the other hand, when the image data corresponding to the transmission request is received until the receivable time period elapses after the transmission request concerned is transmitted, the CPU 302 determines that there is no anomaly in the reception process of the image data corresponding to the transmission request. It should be noted that the anomaly in the reception process of the image data transmitted from the DFE 102 may be determined on the basis of whether the communication between the DFE 102 and MFP 103 is cut in the embodiment.

Receiving the transmission request from the MFP 103, the CPU 201 prepare to transfer the transmission request image data. After that, when the transfer of the transmission request image data is prepared, the CPU 201 notifies the communication management module 405 of a transfer request showing that the transmission request image data can be transferred to the MFP 103 using the RIP module 403 (step S504). Next, the CPU 201 notifies the RIP module 403 that the transfer of the transmission request image data is permitted (transfer permission) using the communication management module 405 (step S505). Next, when a notice of transfer permission is given, the CPU 201 transfers the transmission request image data to the MFP 103 using the RIP module 403 (step S506). Next, the CPU 201 notifies the communication management module 405 that the transmission request image data has been transferred using the RIP module 403 (step S507). Next, the CPU 201 transmits a transfer completion notice showing that the transmission request image data has been transferred to the MFP 103 using the communication management module 405 (step S508).

When receiving the transfer completion notice from the DFE 102, the CPU 302 finishes the abnormal reception detection process by the print processing module 410, and transmits a transfer completion confirmation notice showing that the transfer completion notice has been received to the DFE 102 (step S509).

When receiving the transfer completion confirmation notice from the MFP 103, the CPU 201 notifies the RIP module 403 that the transfer completion confirmation notice has been received using the communication management module 405 (step S510). The print system 100 performs the same process as in the steps S503 through S510 for transmission request image data of second page and after. Accordingly, the MFP 103 transmits the transmission requests corresponding to the respective pages to the DFE 102. The DFE 102 transfers the transmission request image data to the MFP 103 in response to the received transmission requests. When all the transmission request image data have been transferred, the CPU 201 and CPU 302 finish this process.

FIG. 6 is a sequential chart showing procedures of a transfer control process executed by the print system 100 in FIG. 1.

The process in FIG. 6 is performed when the CPU 201 of the DFE 102 runs the various programs stored in the ROM 202 and the CPU 302 of the MFP 103 runs the various programs stored in the ROM 303.

In the abnormal reception detection process in FIG. 5, when anomaly is detected in the reception process of the image data (i.e., when the transmission request image data is not transmitted to the MFP 103 from the DFE 102), the MFP 103 enters an unprintable state. In this case, a conventional print system requires a user to reboot not only the MFP 103 that entered the unprintable state but also the DFE 102 that transmits the image data. Since it is necessary to perform the reboot process for the MFP 103 and the reboot process for the DFE 102 individually, the user spends time and effort more than needed to cancel the unprintable state.

Against this, the embodiment stops the print process that the MFP 103 is executing when anomaly is detected in the transfer process (a print related process related to the print process) of the transmission request image data performed by the DFE 102. Moreover, the MFP 103 shifts to a printable state for preparing a new print process that is different from the print process that the MFP is executing, and the DFE 102 is rebooted in response to the shift of the MFP to the printable state.

As shown in FIG. 6, the CPU 201 performs the process similar to the steps S501 and S502 in FIG. 5, and the CPU 302 performs the process similar to the step S503 in FIG. 5. Next, when receiving the transmission request from the MFP 103, the CPU 201 starts a transfer request timer process for detecting anomaly in the transfer process of the transmission request image data (step S601). Specifically, the CPU 201 determines whether the transfer request is given by the RIP module 403 until a predetermined transfer request detection time period elapses after receiving the transmission request (i.e., whether the transfer request notifying process times out). The transfer request detection time period is set so that the DFE 102 is able to detect anomaly in the transfer process of the transmission request image data by the transfer request timer process before the MFP 103 detects anomaly in the reception process of the transmission request image data by the abnormal reception detection process. In the embodiment, the transfer request detection time period is set to a time period (for example, 30 seconds) that is shorter than the receivable time period (for example, 60 seconds) used in the abnormal reception detection process.

When the transfer request notifying process times out in the step S601, the CPU 201 determines that there is anomaly in the transfer process of the transmission request image data and that the transmission request image data cannot be transmitted to the MFP 103 within the receivable time period. That is, the CPU 201 determines that the MFP 103 is in the unprintable state. After that, the CPU 201 transmits the state shift request for shifting to the printable state for preparing a new print process that is different from the print process that the MFP 103 is executing to the MFP 103 in order to cancel the unprintable state (step S602, a request transmission step).

When receiving the state shift request from the DFE 102, the CPU 302 finishes the abnormal reception detection process. After that, the CPU 302 performs a state shifting process on the basis of the received state shift request (step S603, a state shift control unit). Specifically, the CPU 302 stops the reception process of the transmission request image data under execution and deletes the print setting information stored in the primary buffer and RAM 304 for preparing to receive a new transmission request image data. Accordingly, the MFP 103 shifts to the printable state without a user's operation or instruction. Next, the CPU 302 transmits a state shift completion notice showing that the shift to the printable state is completed to the DFE 102 using the print processing module 410 (step S604, a completion notice transmitting step).

When receiving the state shift completion notice from the MFP 103 (a completion notice reception unit), the CPU 201 reboots the DFE 102 as a process for canceling the anomaly in the transfer process of the transmission request image data (step S605, a reboot step), and finishes this process.

The embodiment assumes that the anomaly is detected in the transfer process of the transmission request image data on the basis of the transfer request detection time period as an example. However, the anomaly may be detected in the transfer process of the transmission request image data on the basis of a transfer completion time period mentioned later.

Figure 7A:
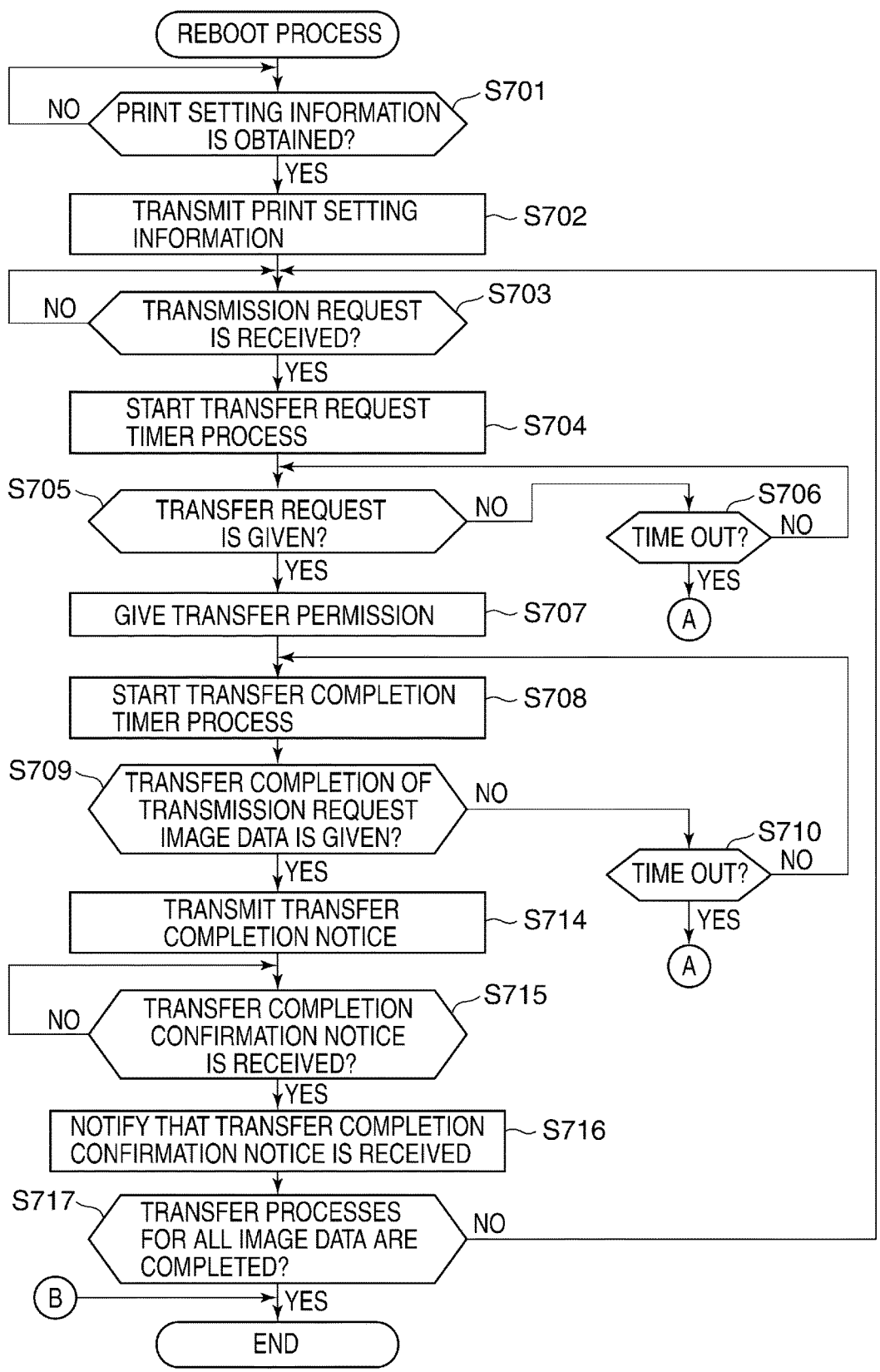
FIG. 7A and FIG. 7B are flowcharts showing procedures of a reboot process executed by the DFE in FIG. 1.
Figure 7B:
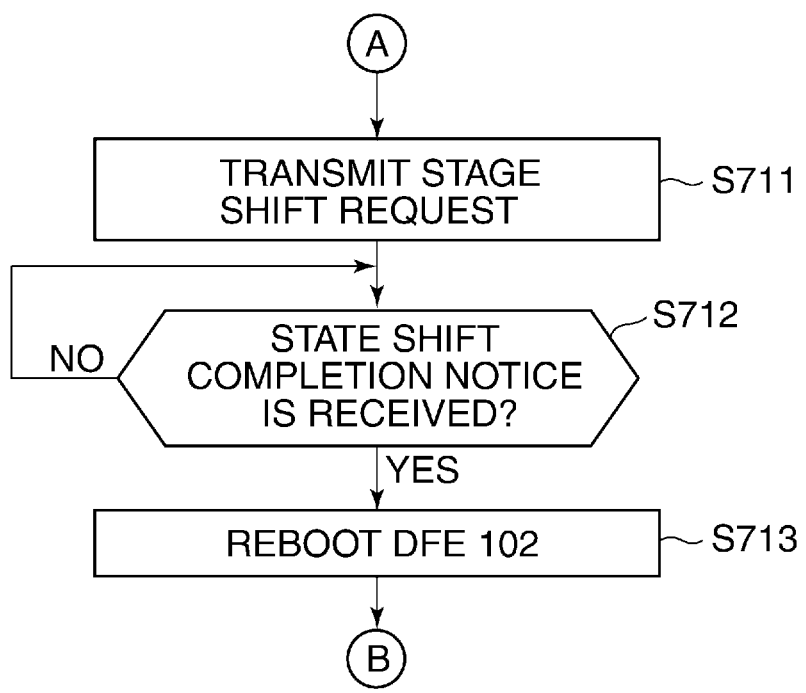

FIG. 7A and FIG. 7B are flowcharts showing procedures of the reboot process executed by the DFE 102 in FIG. 1.

The process in FIG. 7A and FIG. 7B are performed when the CPU 106 runs the various programs stored in the RAM 202.

As shown in FIG. 7A, the CPU 201 first determines whether the extracted print setting information is obtained (step S701). When obtaining the print setting information concerned (YES in the step S701, for example, the step S501 in FIG. 5), the CPU 201 transmits the print setting information to the MFP 103 (step S702, for example, the step S502 in FIG. 5). Next, when receiving a transmission request from the MFP 103 (YES in step S703), the CPU 201 starts the transfer request timer process (the step S704, for example, the step S601 in FIG. 6), and performs processes in steps S705 and S706 mentioned later. In the step S705, the CPU 201 determines whether the notice of the transfer request is given by the RIP module 403 (an anomaly detection step).

As a result of the determination in the step S705, when a transfer request is not given by the RIP module 403, the CPU 201 determines whether the transfer request notifying process times out (step S706, an anomaly detection step).

As a result of the determination in the step S706, when the transfer request notifying process does not time out, the CPU 201 returns the process to the step S705. On the other hand, as a result of the determination in the step S706, when the transfer request notifying process times out, the CPU 201 proceeds with the process to step S711 shown in FIG. 7B.

As a result of the determination in the step S705, when the notice of the transfer request is given (for example, the step S504 in FIG. 5), the CPU 201 finishes the transfer request timer process. After that, the CPU 201 gives a notice of the transfer permission using the communication management module 405 (step S707, for example, the step S505 in FIG. 5). Next, the CPU 201 starts the transfer completion timer process for detecting anomaly in the transfer process of the transmission request image data (step S708), and performs processes in steps S709 and S710 mentioned later. In the step S709, the CPU 201 determines whether the notice of transfer completion is given by the RIP module 403 (the anomaly detection step).

As a result of the determination in the step S709, when the notice of the transfer completion of the transmission request image data is not given, the CPU 201 determines whether the transfer completion notifying process times out (step S710, the anomaly detection step). For example, when a predetermined transfer completion detection time period elapsed after the notification of the transfer permission of the transmission request image data, the CPU 201 determines that the above-mentioned transfer completion notifying process times out. On the other hand, when the predetermined transfer completion detection time period does not elapse after the notification of the transfer permission of the transmission request image data, the CPU 201 determines that the above-mentioned transfer completion notifying process does not time out. The transfer completion detection time period is set so that the DFE 102 is able to detect anomaly in the transfer process of the transmission request image data by the transfer completion timer process before the MFP 103 detects anomaly in the reception process of the transmission request image data by the abnormal reception detection process. In the embodiment, the transfer completion detection time period is set to a time period (for example, 30 seconds) that is shorter than the receivable time period (for example, 60 seconds) used in the abnormal reception detection process.

As a result of the determination in the step S710, when the above-mentioned transfer completion notifying process does not time out, the CPU 201 returns the process to the step S708. On the other hand, as a result of the determination in the step S710, when the above-mentioned transfer completion notifying process times out, the CPU 201 proceeds with the process to the step S711 shown in FIG. 7B, and the communication management module 405 transmits the state shift request to the MFP 103 (for example, the step S602 in FIG. 6). Next, when receiving the state shift completion notice from the MFP 103 (YES in the step S712), the CPU 201 reboots the DFE 102 (step S713, for example, the step S605 in FIG. 6), and finishes this process.

As a result of the determination in the step S709, when the transfer completion notice of the transmission request image data is given (for example, the step S507 in FIG. 5), the CPU 201 finishes the transfer completion timer process. After that, the CPU 201 transmits the transfer completion notice to the MFP 103 using the communication management module 405 (step S714, for example, the step S508 in FIG. 5). Next, when receiving the transfer completion confirmation notice from the MFP 103 (YES in the step S715), the CPU 201 notifies the RIP module 403 that the transfer completion confirmation notice is received by the communication management module 405 (step S716, for example, the step S510 in FIG. 5). After that, the CPU 201 determines whether the transfer processes for all the image data corresponding to the obtained print setting information are completed (step S717).

As a result of the determination in the step S717, when the transfer process for any one of the image data corresponding to the obtained print setting information is not completed, the CPU 201 returns the process to the step S703. On the other hand, as a result of the determination in the step S717, when the transfer processes for all the image data corresponding to the print setting information are completed, the CPU 201 finishes this process.

Figure 8:
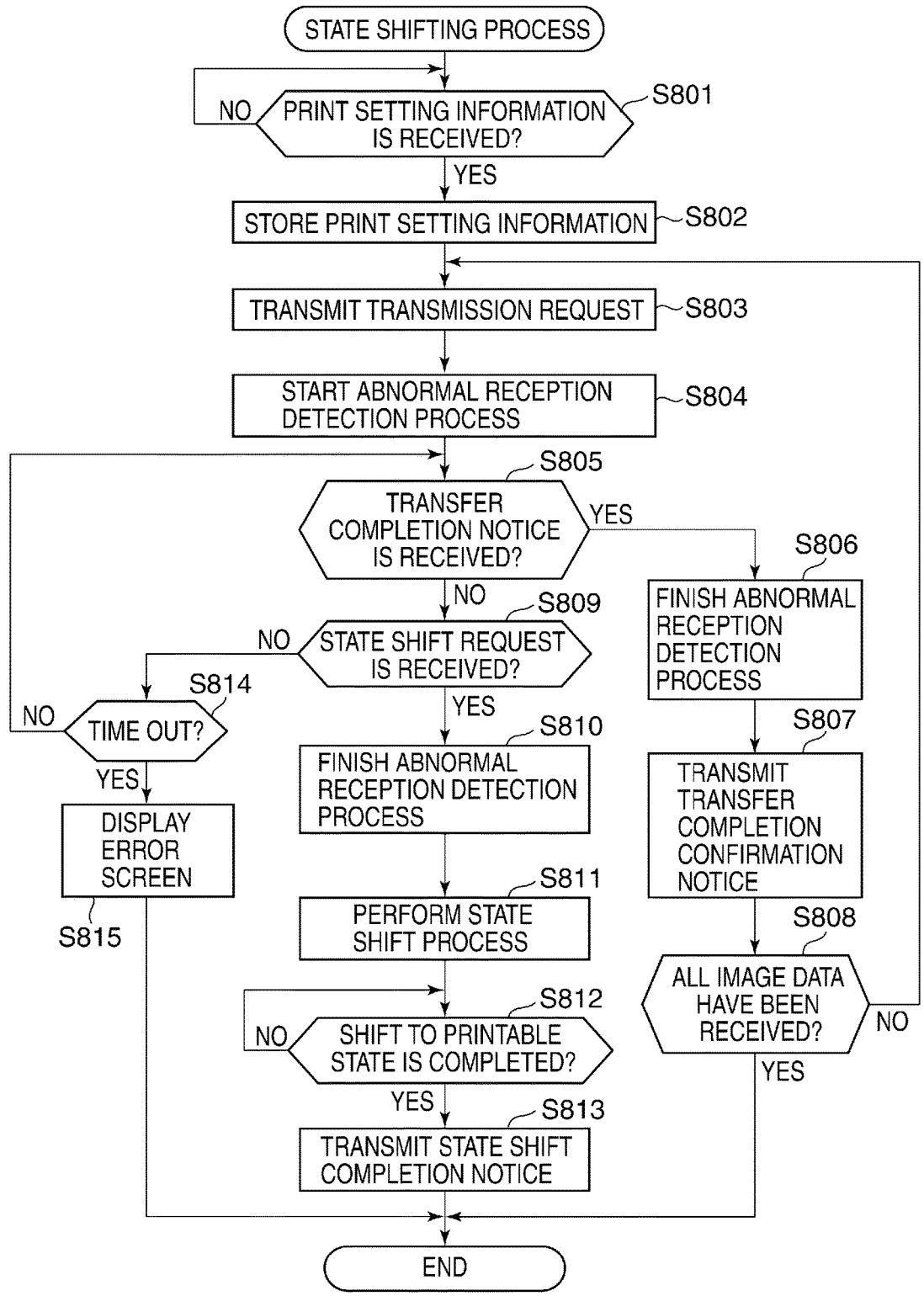
FIG. 8 is a flowchart showing procedures of a state shifting process executed by the MFP in FIG. 1.

FIG. 8 is a flowchart showing procedures of a state shifting process executed by the MFP 103 in FIG. 1.

The process in FIG. 8 is performed when the CPU 302 runs the various programs stored in the RAM 303.

As shown in FIG. 8, when receiving the print setting information from the DFE 102 (YES in the step S801), the CPU 302 first starts the print process including the reception process for the image data corresponding to the received print setting information. Next, the CPU 302 stores the print setting information into the RAM 304 (step S802). Moreover, the CPU 302 reserves the primary buffer that stores the image data transmitted from the DFE 102 in the RAM 304. Next, the CPU 302 transmits the transmission request of the transmission request image data to the DFE 102 (step S803, for example, the step S503 in FIG. 5), and starts the abnormal reception detection process (step S804). Next, the CPU 302 determines whether the transfer completion notice is received from the DFE 102 (step S805).

As a result of the determination in the step S805, when the transfer completion notice is received from the DFE 102, the CPU 302 finishes the abnormal reception detection process (step S806). Next, the CPU 302 transmits the transfer completion confirmation notice to the DFE 102 (the step S807, for example, the step S509 in FIG. 5). After that, the CPU 302 determines whether all the image data corresponding to the received print setting information have been received (step S808).

As a result of the determination in the step S808, when any one of the image data corresponding to the received print setting information is not received, the CPU 302 returns the process to the step S803. On the other hand, as a result of the determination in the step S808, when all the image data corresponding to the print setting information have been received, the CPU 302 finishes this process.

As a result of the determination in the step S805, when the transfer completion notice is not received from the DFE 102, the CPU 302 determines whether the state shift request is received from the DFE 102 (step S809).

As a result of the determination in the step S809, when the state shift request is received from the DFE 102, the CPU 302 finishes the abnormal reception detection process (step S810). Next, the CPU 302 performs the state shifting process (step S811, for example, the step S603 in FIG. 6). Specifically, the CPU 302 deletes the print setting information stored in the step S802, and frees the primary buffer in the RAM 304. Next, when the shift to the printable state is completed by the state shifting process (YES in the step S812), the CPU 302 transmits the state shift completion notice to the DFE 102 (step S813, for example, the step S604 in FIG. 6), and will finish this process.

As a result of the determination in the step S809, when the state shift request is not received from the DFE 102, the CPU 302 determines whether the reception process of the state shift request times out (step S814). When the receivable time period elapsed after transmitting the transmission request in the step S814, the CPU 302 determines that the reception process of the state shift request times out. On the other hand, when the receivable time period does not elapse after transmitting the transmission request, the CPU 302 determines that the reception process of the state shift request does not time out.

Figure 9:
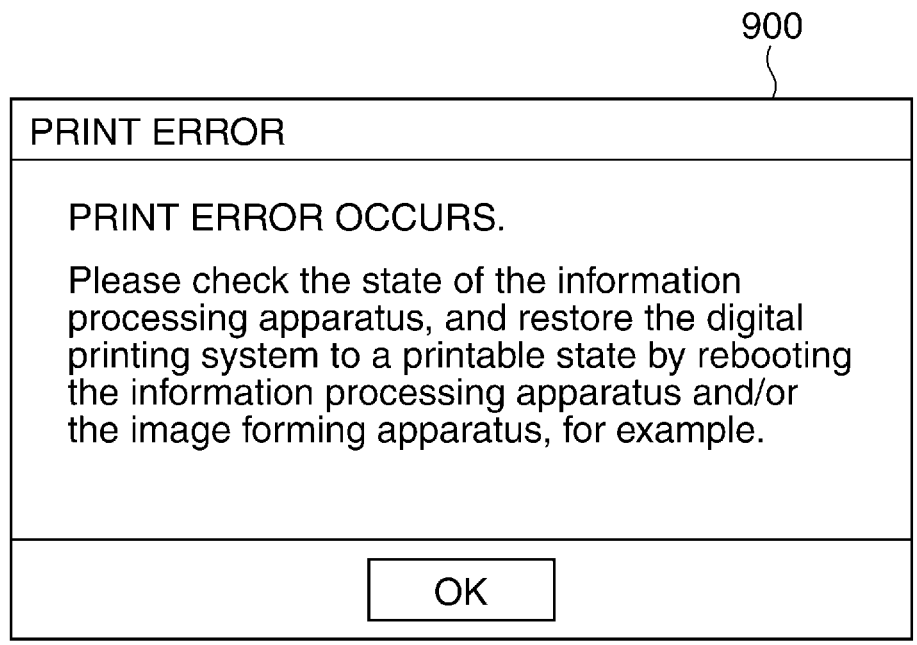
FIG. 9 is a view of an example of an error screen displayed on the MFP in FIG. 1.

As a result of the determination in the step S814, when the reception process of the state shift request does not time out, the CPU 201 returns the process to the step S805. On the other hand, as a result of the determination in the step S814, when the reception process of the state shift request times out, the CPU 302 displays an error screen 900 shown in FIG. 9 on the operation panel (not shown) of the MFP 103 (step S815). The error screen 900 includes a message showing that the print process cannot be performed because an error occurs in the MFP 103. After that, the CPU 302 finishes this process after performing the process in the step S815.

According to the processes in FIG. 6 through FIG. 8, when the anomaly is detected in the transfer process of the transmission request image data performed by the DFE 102, the MFP 103 shifts to the printable state, and the DFE 102 reboots in response to the shift of the MFP 103 to the printable state. That is, the MFP 103 shifts to the printable state without a user's operation or instruction, and the DFE 102 reboots. Accordingly, the unprintable state can be canceled without troubling a user.

Moreover, in the above-mentioned processes in FIG. 6 through FIG. 8, the MFP 103 shifts to the printable state in response to the state shift request transmitted to the MFP 103 from the DFE 102. Then, the DFE 102 reboots in response to the state shift completion notice transmitted to the DFE 102 from the MFP 103. This certainly enables to do away with a user's operation relating to the shift of the MFP 103 to the printable state and the reboot of the DFE 102.

Although the present invention is described above using the embodiment, the present invention is not limited to the embodiment mentioned above.

For example, when the anomaly is detected in the transfer process of the transmission request image data performed by the DFE 102, the CPU 201 may perform a restoration process that restores the anomaly in the transfer process of the transmission request image data.

Figure 10A:
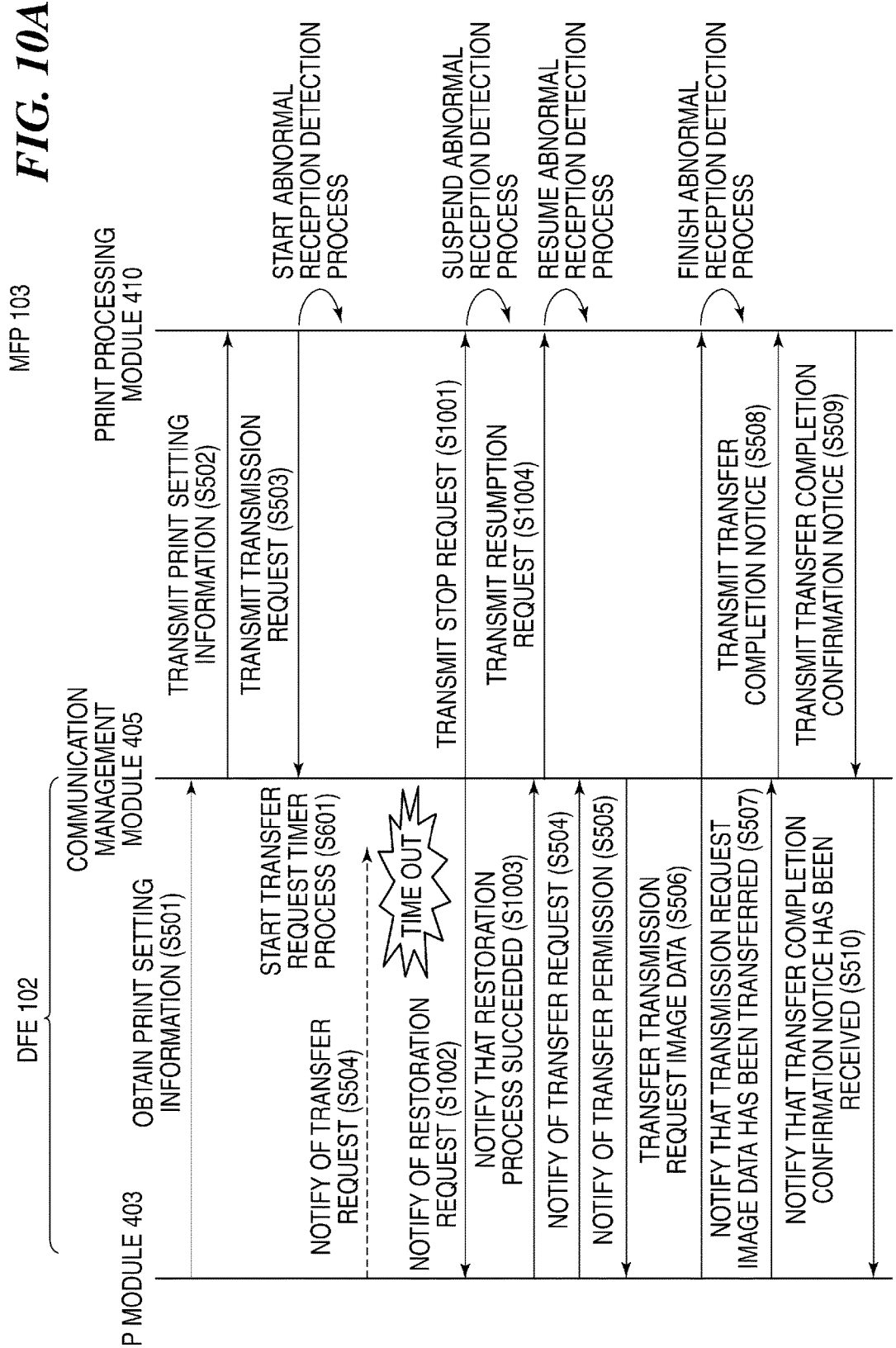

FIG. 10A and FIG. 10B are sequential charts showing procedures of a first modification of the transfer control process in FIG. 6. FIG. 10A shows a case where the restoration process succeeded, and FIG. 10B shows a case where the restoration process failed.

The processes in FIG. 10A and FIG. 10B are performed when the CPU 201 of the DFE 102 runs the various programs stored in the ROM 202 and the CPU 302 of the MFP 103 runs the various programs stored in the ROM 303. The processes in FIG. 10A and FIG. 10B are premised on the case where a transfer request notifying process times out, as an example.

As shown in FIG. 10A, the CPU 201 performs the process similar to the steps S501 in FIG. 6, and the CPU 302 performs the process similar to the steps S502 and S503 in FIG. 6. Next, the CPU 201 performs the process similar to the step S601 in FIG. 6.

In the step S601, when the transfer request notifying process times out, the CPU 201 detects the anomaly in the transfer process of the transmission request image data. After that, the CPU 201 transmits a stop request that instructs the MFP 103 to stop the abnormal reception detection process by the communication management module 405 (step S1001).

When the stop request is received from the DFE 102, the CPU 302 makes the MFP 103 be on standby by suspending the abnormal reception detection process by the print processing module 410 in response to the stop request concerned. In the case, the MFP 103 does not shift to the unprintable state.

The CPU 201 notifies the RIP module 403 of a restoration request that instructs execution of the restoration process for the anomaly in the transfer process of the transmission request image data using the communication management module 405 (step S1002), after performing the process in the step S1001. Next, the CPU 201 performs the restoration process using the RIP module 403 (a restoration step). A success or failure of the restoration process is determined on the basis of whether the restoration process is completed within a predetermined restorable time period that is set so as not to disturb the executions of the various processes performed by the DFE 102. For example, when the restoration process is completed before the restorable time period elapses after the notice of the restoration request is given, the CPU 201 determines that the restoration process succeeded. On the other hand, when the restoration process is not completed before the restorable time period elapses after the notice of the restoration request is given, the CPU 201 determines that the restoration process failed.

When the restoration process succeeded, the CPU 201 notifies the communication management module 405 that the restoration process succeeded using the RIP module 403 (step S1003). Next, since the anomaly in the transfer process of the transmission request image data is canceled, the CPU 201 transmits a resumption request that requires resumption of the abnormal reception detection process to the MFP 103 using the communication management module 405 (step S1004). When receiving the resumption request from the DFE 102, the CPU 302 releases standby of the MFP 103 and resumes the abnormal reception detection process. Next, the CPU 201 and CPU 302 perform the processes following the step S504 in FIG. 5, and finish this process.

When the restoration process failed, the CPU 201 notifies that the restoration process failed (step S1005) as shown in FIG. 10B. Next, the CPU 302 and CPU 201 perform the processes following the step S601 in FIG. 6. That is, the embodiment is able to cancel the unprintable state because the MFP 103 shifts to the printable state and the DFE 102 reboots even if the restoration process fails. After that, the CPU 201 finishes this process after performing the process similar to the step S605 in FIG. 6.

The embodiment assumes that the anomaly is detected in the transfer process of the transmission request image data on the basis of the timeout of the transfer request notifying process as an example. However, the anomaly may be detected in the transfer process of the transmission request image data on the basis of timeout of the transfer completion notifying process. Details will be described later with reference to FIG. 11A, FIG. 11B, and FIG. 11C.

Figure 11A:
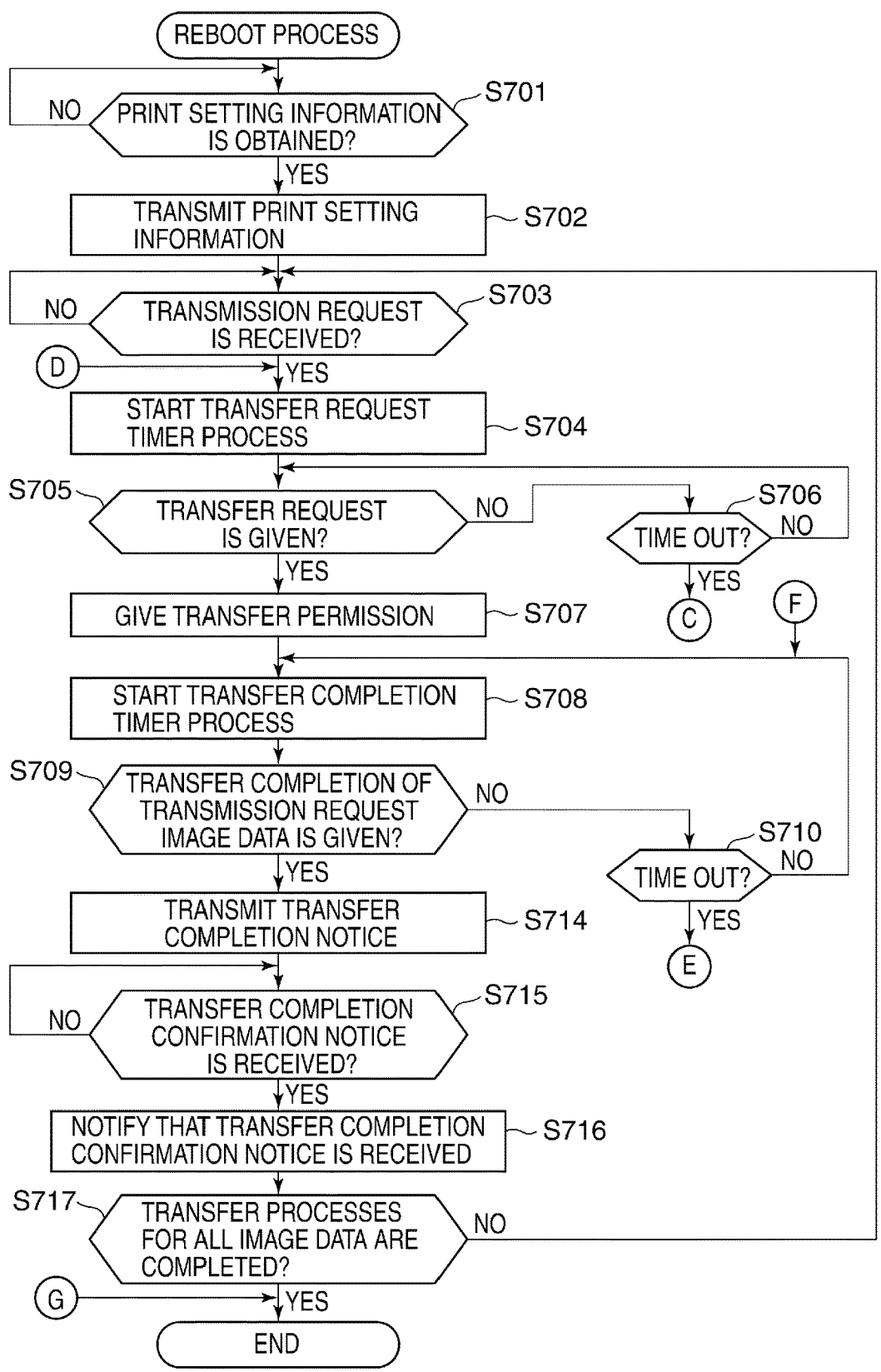
FIG. 11A, FIG. 11B, and FIG. 11C are flowcharts showing procedures of a first modification of the reboot process in FIG. 7A and FIG. 7B.
Figure 11B:
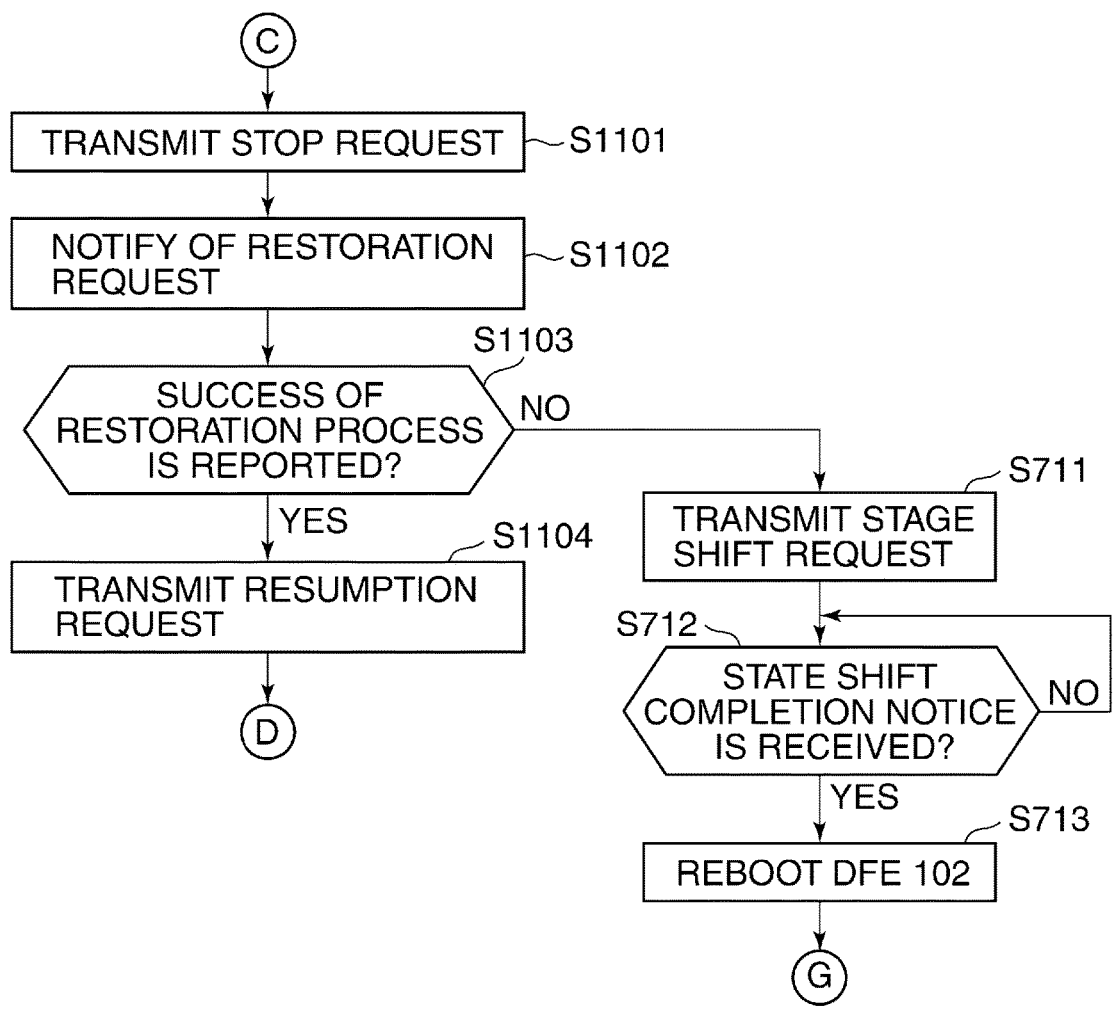
Figure 11C:
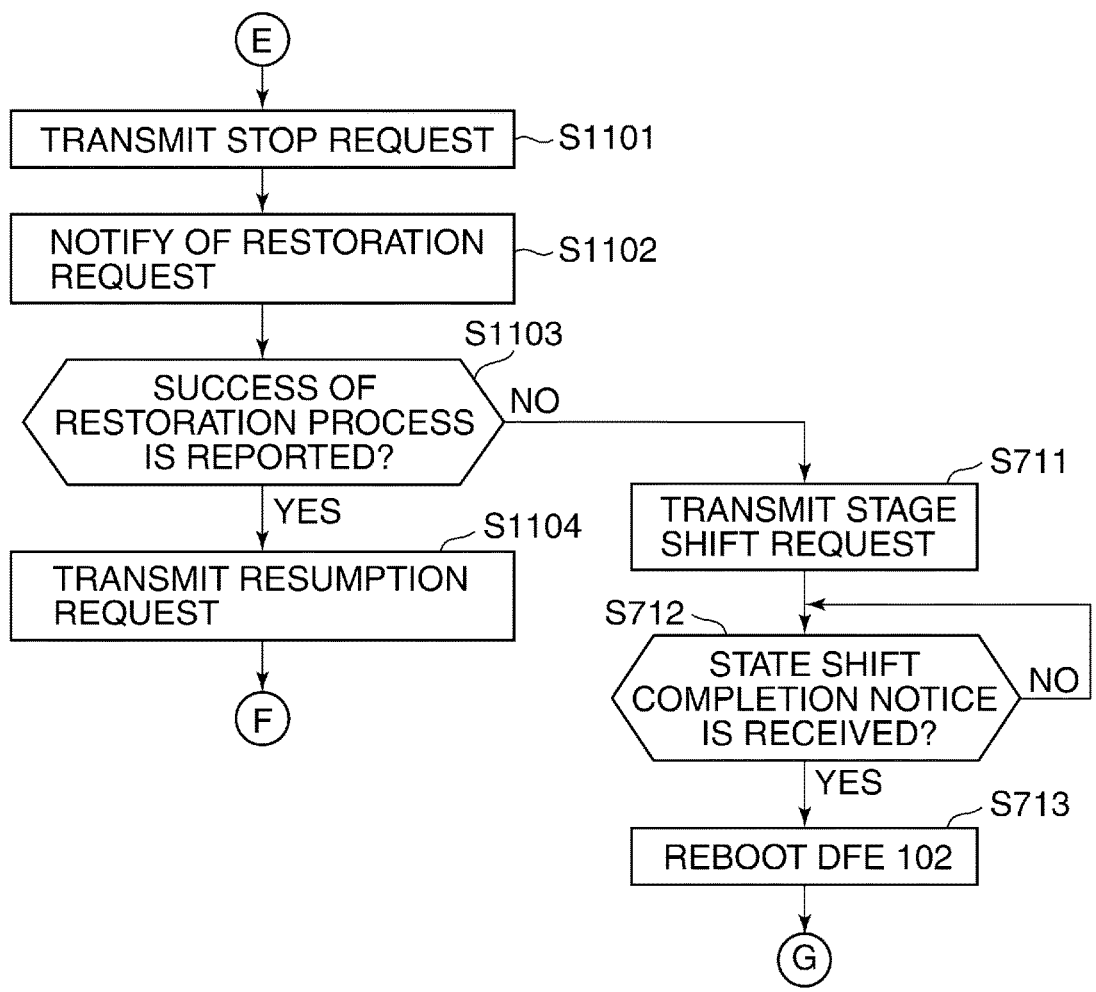

FIG. 11A, FIG. 11B, and FIG. 11C are flowcharts showing procedures of a first modification of the reboot process in FIG. 7A and FIG. 7B.

The processes in FIG. 11A, FIG. 11B, and FIG. 11C are performed when the CPU 201 runs the various programs stored in the RAM 202.

As shown in FIG. 11A, the CPU 201 performs the process similar to the steps S701 through S706 first.

As a result of the determination in the step S706, when the transfer request notifying process does not time out, the CPU 201 returns the process to the step S705. On the other hand, as a result of the determination in the step S706, when the transfer request notifying process times out, the CPU 201 proceeds with the process to step S1101 in FIG. 11B, and transmits the stop request to the MFP 103 using the communication management module 405 (for example, the step S1001 in FIG. 10A). Next, the CPU 201 notifies the RIP module 403 of the restoration request by the communication management module 405 (step S1102, for example, the step S1002 in FIG. 10A), and starts the restoration process. After that, the CPU 201 determines whether the success of the restoration process is reported by the RIP module 403 (step S1103).

As a result of the determination in the step S1103, when the failure of the restoration process is reported (for example, the step S1005 in FIG. 10B), the CPU 201 performs the processes following the step S711 in FIG. 7B. On the other hand, as a result of the determination in the step S1103, when the success of the restoration process is reported (for example, the step S1003 in FIG. 10A), the CPU 201 transmits the resumption request of the abnormal reception detection process to the MFP 103 (step S1104, for example, the step S1004 in FIG. 10A), and returns the process to the step S704.

As a result of the determination in the step S705, when the transfer request of the image data is given by the RIP module 403, the CPU 201 performs the processes similar to the steps S707 through S710 in FIG. 7A.

As a result of the determination in the step S710, when the transfer completion notifying process does not time out, the CPU 201 returns the process to the step S708. On the other hand, as a result of the determination in the step S710, when the transfer completion notifying process times out, the CPU 201 proceeds with the process to step S1101 in FIG. 11C, and performs the processes similar to the steps S1101 through S1103.

As a result of the determination in the S1103, when the failure of the restoration process is reported, the CPU 201 performs the processes following the step S711 in FIG. 7B. On the other hand, as a result of the determination in the step S1103, when the success of the restoration process is reported, the CPU 201 performs the process similar to the step S1104, and returns the process to the step S708.

As a result of the determination in the step S709, when the transfer completion notice of the transmission request image data is given, the CPU 201 performs the process following the step S714, and finishes this process.

Figure 12:
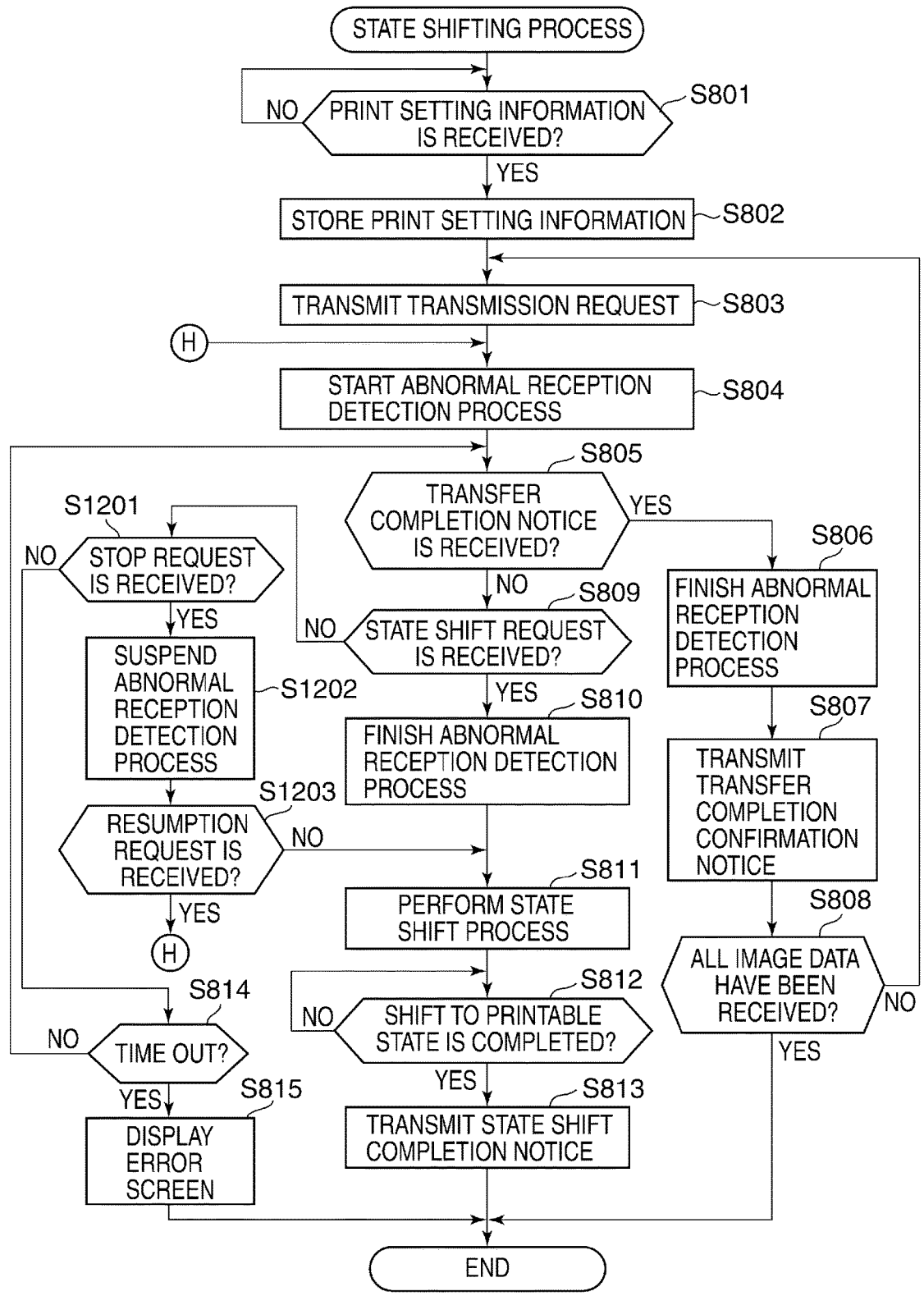
FIG. 12 is a flowchart showing procedures of a modification of the state shifting process in FIG. 8.

FIG. 12 is a flowchart showing procedures of a modification of the state shifting process in FIG. 8.

The process in FIG. 12 is performed when the CPU 302 runs the various programs stored in the RAM 303.

As shown in FIG. 12, the CPU 302 performs the process similar to the steps S801 through S809 in FIG. 8 first.

As a result of the determination in the step S809, when the state shift request is received from the DFE 102, the CPU 302 performs the process similar to the steps S810 through S813 in FIG. 8, and finishes this process. On the other hand, as a result of the determination in the step S809, when the state shift request is not received from the DFE 102, the CPU 302 determines whether the stop request is received from the DFE 102 (step S1201).

As a result of the determination in the step S1201, when the stop request is received from the DFE 102, the CPU 302 makes the MFP 103 be on standby by suspending the abnormal reception detection process (step S1202). Next, the CPU 302 determines whether the resumption request is received (step S1203).

As a result of the determination in the step S1203, when the resumption request is received, the CPU 302 returns the process to the step S804. On the other hand, as a result of the determination in the step S1203, when the resumption request is not received, the CPU 302 performs the process following the step S811 in FIG. 8, and finishes this process.

As a result of the determination in the step S1201, when the stop request is not received from the DFE 102, the CPU 302 performs the process following the step S814 in FIG. 8, and finishes this process.

In the above-mentioned processes in FIG. 10A through FIG. 12, when the DFE 102 starts the restoration process of the anomaly in the transfer process of the transmission request image data, the MFP 103 is on standby without shifting to the unprintable state. And when the restoration process is completed within the restorable time period, the standby of the MFP 103 is released. That is, even if anomaly is detected in the transfer process of the transmission request image data, the MFP 103 is on standby during the period less than the restorable time period, and the MFP 103 does not shift to the unprintable state that requires reboot of the MFP 103. Accordingly, the frequency of a case that requires the reboot of the MFP 103 decreases, which reduces user's time and effort more.

The embodiment may determine whether the MFP 103 should shift to the printable state on the basis of the number of times of detecting anomaly in the transfer process of the transmission request image data.

Figure 13:
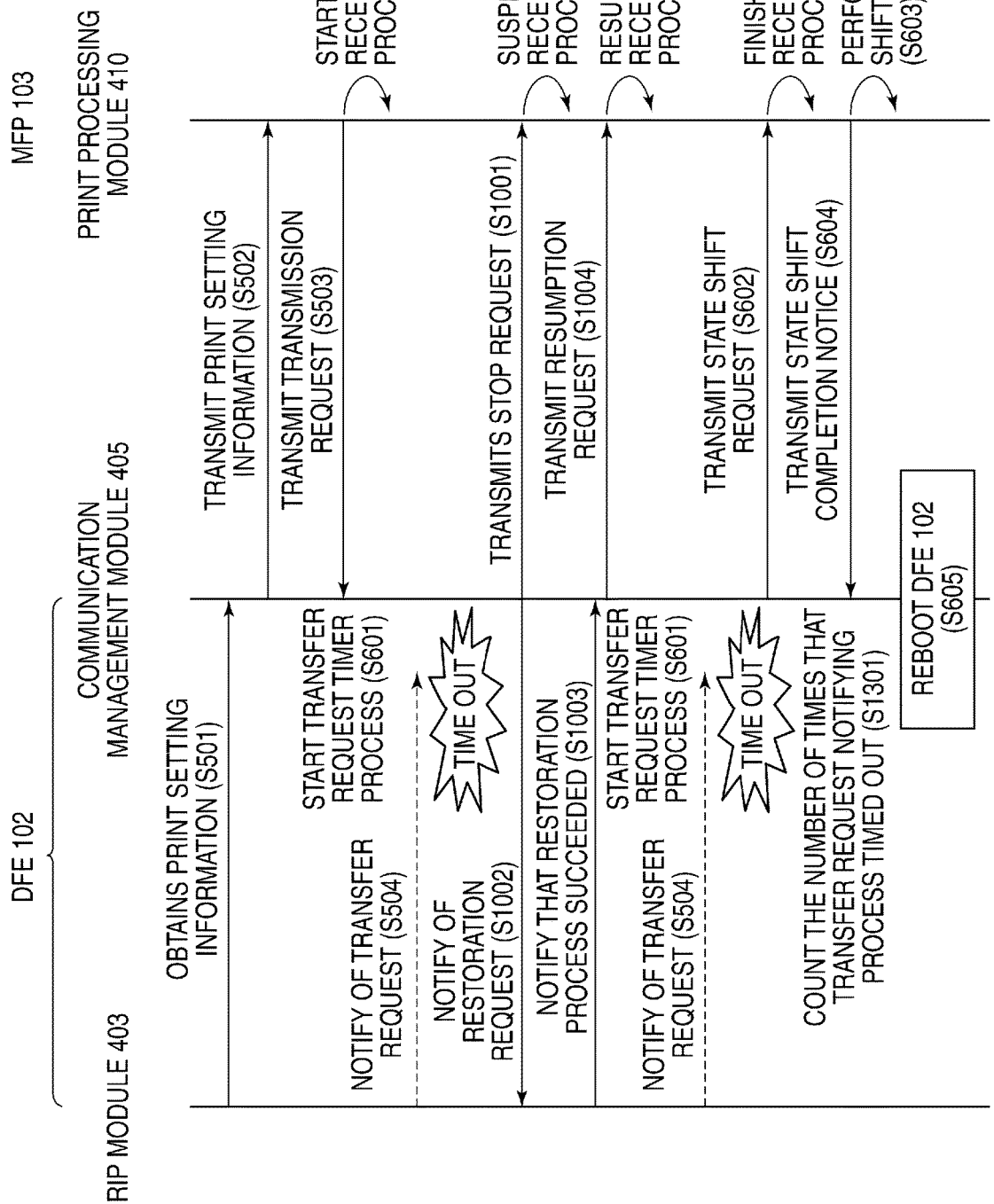
FIG. 13 is a sequential chart showing procedures of a second modification of the transfer control process in FIG. 6.

FIG. 13 is a sequential chart showing procedures of a second modification of the transfer control process in FIG. 6.

The process in FIG. 13 is performed when the CPU 201 of the DFE 102 runs the various programs stored in the ROM 202 and the CPU 302 of the MFP 103 runs the various programs stored in the ROM 303.

As shown in FIG. 13, the CPU 201 and CPU 302 first perform the steps S501, S502, S503, S601, S1001, S1002, S1003, and S1004 in FIG. 10A. Next, the CPU 201 starts the transfer request timer process (step S601) after transmitting a start request of the abnormal reception detection process to the MFP 103.

When the transfer request notifying process times out in the step S601, the CPU 201 counts the number of times that the transfer request notifying process times out (step S1301, a counting step). After that, the CPU 201 determines whether the number of times concerned is equal to or more than a predetermined number. For example, when the number of times that the transfer request notifying process times out is equal to or more than the predetermined number, the CPU 201 determines that restoration of the anomaly in the transfer process of the transmission request image data is difficult. After that, the CPU 201 performs the process following the step S601 in FIG. 6.

That is, when the number of times that the transfer request notifying process times out is equal to or more than the predetermined number, the MFP 103 shifts to the printable state and the DFE 102 reboots in the embodiment, The embodiment assumes that the anomaly is detected in the transfer process of the transmission request image data on the basis of the timeout of the transfer request notifying process as an example. However, the anomaly may be detected in the transfer process of the transmission request image data on the basis of timeout of the transfer completion notifying process. Details will be described later with reference to FIG. 14A, FIG. 14B, and FIG. 14C.

Figure 14A:
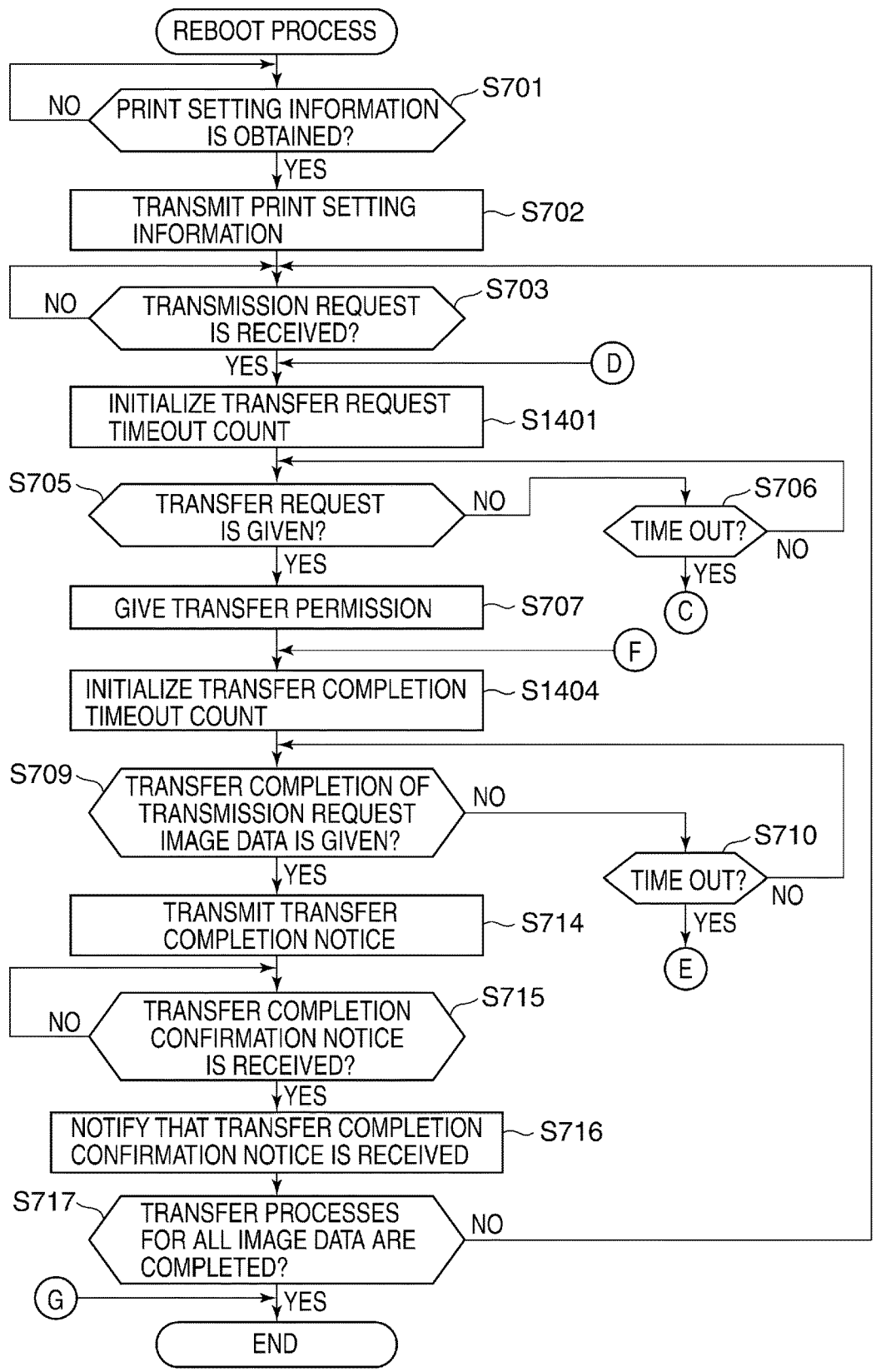
FIG. 14A, FIG. 14B, and FIG. 14C are flowcharts showing procedures of a second modification of the reboot process in FIG. 7A and FIG. 7B.
Figure 14B:
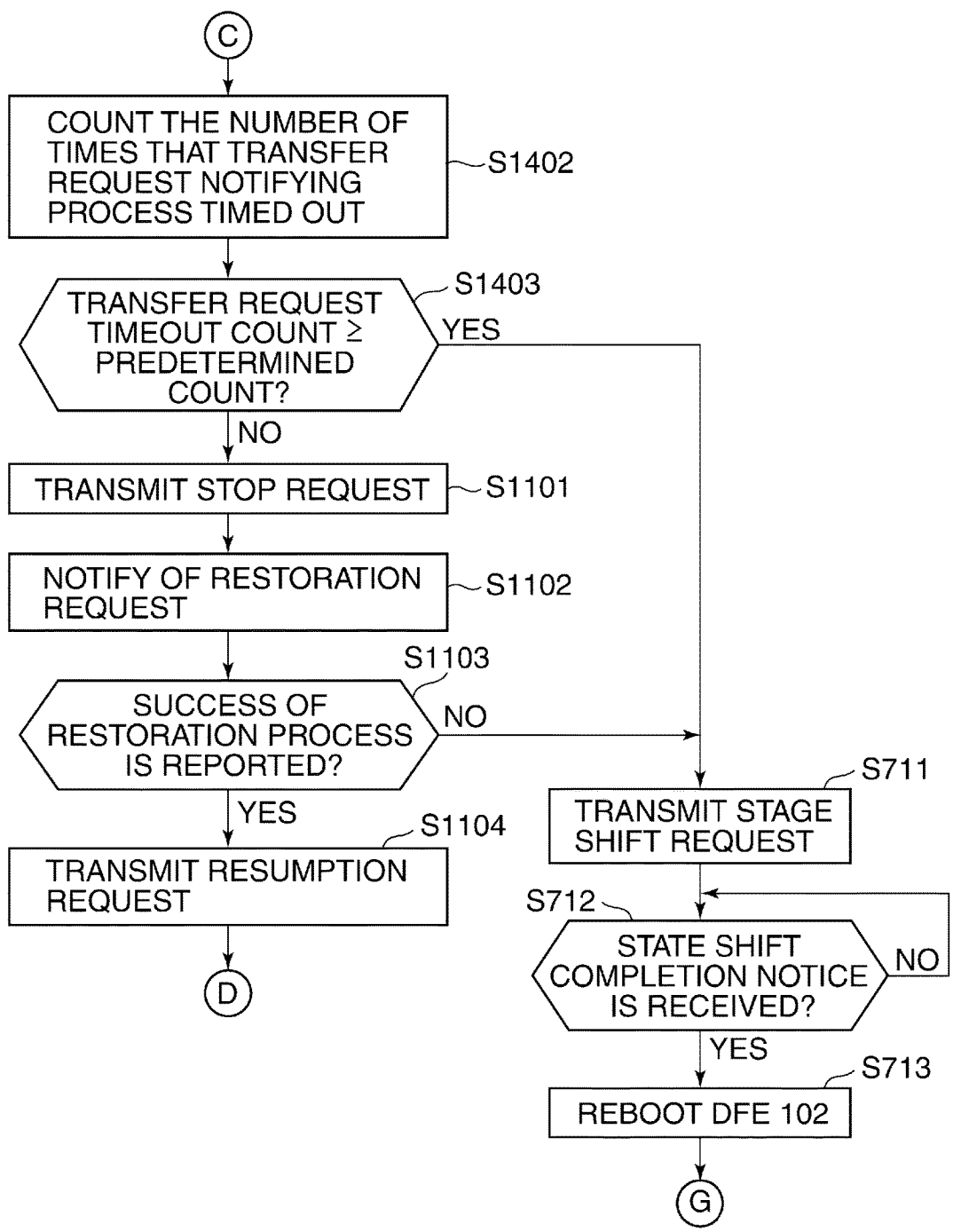
Figure 14C:
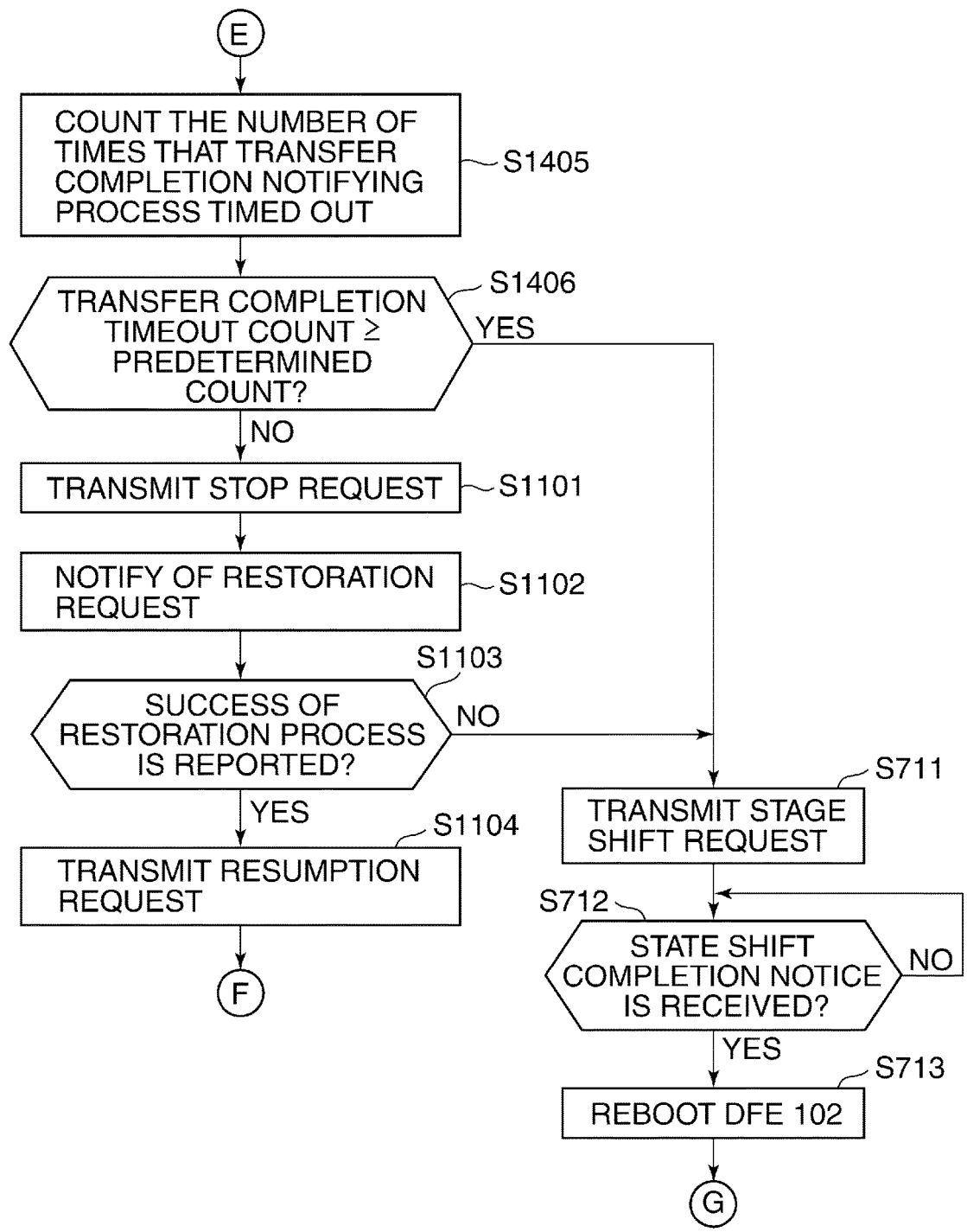

FIG. 14A, FIG. 14B, and FIG. 14C are flowcharts showing procedures of a second modification of the reboot process in FIG. 7A and FIG. 7B.

The processes in FIG. 14A, FIG. 14B, and FIG. 14C are performed when the CPU 201 runs the various programs stored in the RAM 202.

As shown in FIG. 14A, the CPU 201 performs the process similar to the steps S701 through S703 in FIG. 7A first. Next, the CPU 201 initializes a count value that shows the number of times that the transfer request notifying process times out (hereinafter referred to as a "transfer request timeout count", simply) to zero (step S1401). Next, the CPU 201 performs the process similar to the steps S705 and S706 in FIG. 7A.

As a result of the determination in the step S706, when the transfer request notifying process does not time out, the CPU 201 returns the process to the step S705. On the other hand, as a result of the determination in the S706, when the transfer request notifying process times out, the CPU 201 proceeds with the process to step S1402 in FIG. 14B, counts the number of times that the transfer request notifying process times out (for example, the step S1301 in FIG. 13), and adds one to the transfer request timeout count. Next, the CPU 201 determines whether the transfer request timeout count is equal to or more than the predetermined number (step S1403).

As a result of the determination in the step S1403, when the transfer request timeout count is equal to or more than the predetermined number, the CPU 201 performs the process following the step S711 in FIG. 7B. On the other hand, as a result of the determination in the step S1403, when the transfer request timeout count is less than the predetermined number, the CPU 201 performs the process similar to the steps S1101 through S1104 in FIG. 11B, and returns the process to the step S1401.

As a result of the determination in the step S705, when the notice of the transfer request is given by the RIP module 403, the CPU 201 performs the process similar to the step S707 in FIG. 11A. Next, the CPU 201 initializes a count value that shows the number of times that the transfer completion notifying process times out (hereinafter referred to as a "transfer completion timeout count", simply) to zero (step S1404). Next, the CPU 201 performs the process similar to the steps S709 and S710 in FIG. 7A.

As a result of the determination in the step S710, when the transfer completion notifying process does not time out, the CPU 201 returns the process to the step S709. On the other hand, as a result of the determination in the S710, when the transfer completion notifying process times out, the CPU 201 proceeds with the process to step S1405 in FIG. 14C, counts the number of times that the transfer completion notifying process times out (the counting step), and adds one to the transfer completion timeout count. In the embodiment, the transfer request timeout count and the transfer completion timeout count are equivalent to the number of times of detecting anomaly in the transfer process of the transmission request image data. Next, the CPU 201 determines whether the transfer completion timeout count is equal to or more than the predetermined number (step S1406).

As a result of the determination in the step S1406, when the transfer completion timeout count is equal to or more than the predetermined number, the CPU 201 performs the process following the step S711 in FIG. 7B. On the other hand, as a result of the determination in the step S1406, when the transfer completion timeout count is less than the predetermined number, the CPU 201 performs the process similar to the steps S1101 through S1104 in FIG. 11B, and returns the process to the step S1404.

As a result of the determination in the step S709, when the transfer completion notice of the transmission request image data is given, the CPU 201 performs the process following the step S714, and finishes this process.

In the above-mentioned processes in FIG. 13, FIG. 14A, FIG. 14B, and FIG. 14C, when the transfer completion timeout count is equal to or more than the predetermined number, the MFP 103 shifts to the printable state. When the transfer completion timeout count is equal to or more than the predetermined number, it is considered that the restoration of the anomaly in the transfer process of the transmission request image data is difficult. Accordingly, it is preferable that the print process under execution by the MFP 103 is stopped to prepare a new print process other than the previous print process from a point of view of the efficiency improvement of the print process. Against this, since the MFP 103 shifts to the printable state when the transfer completion timeout count reaches the predetermined number in the processes in FIG. 13, FIG. 14A, FIG. 14B, and FIG. 14C, the efficiency of the print process is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166813, filed Aug. 26, 2015, which is hereby incorporated by reference herein in its entirety.

What is claimed is:

1. A print control method by which print data is transmitted from an information processing apparatus to an image forming apparatus, the print control method comprising:
   detecting an event in which the print data is not transmitted normally from the information processing apparatus to the image forming apparatus;
   causing, by the information processing apparatus, the image forming apparatus to suspend an execution of a print process in a case where the event is detected;
   performing a predetermined process which enables the print data to be transmitted normally from the information processing apparatus to the image forming apparatus in a case where the event is detected; and
   transmitting at least a part of the print data, which has not been transmitted to the image forming apparatus, after the predetermined process is performed,
   wherein the image forming apparatus resumes the suspended printing process after the predetermined process is performed.

2. The print control method according to claim 1, further comprising:

controlling the image forming apparatus to be on standby by suspending the print process under execution by the image forming apparatus in a case where the predetermined process is started; and resuming the suspended print process by releasing the standby of the image forming apparatus in a case where the predetermined process is completed within a predetermined time period.

3. The print control method according to claim 2, further comprising:

counting the number of times of detecting the event in the print related process; and controlling the image forming apparatus to shift to a printable state for preparing a new print process, in a case where the number of times of detecting the event reaches a predetermined number.

4. A non-transitory computer-readable storage medium storing a control program causing a computer to execute a print control method by which print data is transmitted from an information processing apparatus to an image forming apparatus, the print control method comprising:

detecting an event in which the print data is not transmitted normally from the information processing apparatus to the image forming apparatus;

causing, by the information processing apparatus, the image forming apparatus to suspend an execution of a print process in a case where the event is detected;

performing a predetermined process which enables the print data to be transmitted normally from the information processing apparatus to the image forming apparatus in a case where the event is detected; and transmitting at least a part of the print data, which has not been transmitted to the image forming apparatus, after the predetermined process is performed, wherein the image forming apparatus resumes the suspended printing process after the predetermined process is performed.

5. An information processing apparatus comprising:

a memory device that stores a set of instructions; and at least one processor that executes the set of instructions to:

transmit print data to an image forming apparatus;

detect an event in which the print data is not transmitted normally from the information processing apparatus to the image forming apparatus;

cause the image forming apparatus to suspend an execution of a print process, in a case where the event abnormal status is detected;

perform a predetermined process which enables the print data to be transmitted normally from the information processing apparatus to the image forming apparatus in a case where the event is detected; and transmit at least a part of the print data, which has not been transmitted to the image forming apparatus, after the predetermined process is performed, wherein the image forming apparatus resumes the suspended printing process after the predetermined process is performed.

6. The information processing apparatus according to claim 5, wherein the at least one processor further executes the instructions to:

control the image forming apparatus to be on standby by suspending a print process under execution by the image forming apparatus in a case where the predetermined process is started; and resume the suspended print process by releasing the standby of the image forming apparatus in a case where the predetermined process is completed within a predetermined time period.

7. The information processing apparatus according to claim 6, wherein the at least one processor further executes the instructions to:

count the number of times of detecting the event in the print related process;

control the image forming apparatus to shift to a printable state for preparing a new print process, in a case where the number of times detected reaches a predetermined number; and reboot the information processing apparatus in a case where the image forming apparatus has shifted to the printable state.

8. The information processing apparatus according to claim 5, wherein the at least one processor further executes the instructions to:

receive, from the image forming apparatus, a transmission request of a plurality of pages; and transmit, in response to the received transmission request, at least a part of the plurality of pages which has not been transmitted because of the event to the image forming apparatus, in a case where the predetermined process is performed.

9. The information processing apparatus according to claim 5, wherein the predetermined process is a restoration process of the information processing apparatus.

10. The information processing apparatus according to claim 5, wherein the predetermined process is a reboot process of the information processing apparatus.

* * * * *